United States Patent
Haga et al.

(10) Patent No.: US 10,627,905 B2
(45) Date of Patent: Apr. 21, 2020

(54) TACTILE SENSE PRESENTATION DEVICE, ELECTRONIC APPARATUS, AND METHOD OF DRIVING TACTILE SENSE PRESENTATION DEVICE

(71) Applicant: NLT Technologies, Ltd., Kawasaki, Kanagawa (JP)

(72) Inventors: Hiroshi Haga, Kawasaki (JP); Daisuke Sugimoto, Kawasaki (JP)

(73) Assignee: TIANMA MICROELECTRONICS CO., LTD., Shenzhen (CN)

( * ) Notice: Subject to any disclaimer, the term of this patent is extended or adjusted under 35 U.S.C. 154(b) by 296 days.

(21) Appl. No.: 15/080,722

(22) Filed: Mar. 25, 2016

(65) Prior Publication Data
US 2016/0282944 A1  Sep. 29, 2016

(30) Foreign Application Priority Data

Mar. 26, 2015 (JP) ................... 2015-064753
Jan. 7, 2016 (JP) ................... 2016-001986

(51) Int. Cl.
*G06F 3/01* (2006.01)
*G06F 3/042* (2006.01)
(Continued)

(52) U.S. Cl.
CPC ............. *G06F 3/016* (2013.01); *G06F 3/042* (2013.01); *G06F 3/044* (2013.01); *G06F 3/0416* (2013.01);
(Continued)

(58) Field of Classification Search
CPC ...................................... G06F 3/016
See application file for complete search history.

(56) References Cited

U.S. PATENT DOCUMENTS

2002/0114934 A1* 8/2002 Liu ................ C08F 2/44
428/212
2006/0014038 A1* 1/2006 Sasaki ............ C04B 35/486
428/610
(Continued)

FOREIGN PATENT DOCUMENTS

CN   102906669 A    1/2013
JP   2011-248884 A  12/2011
(Continued)

OTHER PUBLICATIONS

Communication dated Sep. 3, 2019, from the China National Intellectual Property Administration in counterpart Application No. 201610179818.3.

(Continued)

*Primary Examiner* — William Boddie
*Assistant Examiner* — Andrew B Schnirel
(74) *Attorney, Agent, or Firm* — Sughrue Mion, PLLC

(57) ABSTRACT

A tactile sense presentation device includes a panel that includes a support substrate, a plurality of electrodes, which are formed on the support substrate, extending in a predetermined direction, and an insulating layer covering the plurality of electrodes; and a drive unit that drives the panel, wherein a tactile sense is presented to an operator based on an electrostatic force generated between the electrodes and the operator by the drive unit applying a signal of a voltage to the electrode, a contact face of the insulating layer that is in contact with the operator has a surface roughness Ra of a predetermined range, and the voltage applied to the electrodes corresponding to an area in which the tactile sense is presented to the operator is a voltage corresponding to the surface roughness Ra of the contact face.

17 Claims, 25 Drawing Sheets

(51) Int. Cl.
*G06F 3/041* (2006.01)
*G06F 3/0488* (2013.01)
*G06F 3/044* (2006.01)

(52) U.S. Cl.
CPC .................. *G06F 3/04886* (2013.01); *G06F 2203/04111* (2013.01); *G06F 2203/04809* (2013.01)

(56) References Cited

U.S. PATENT DOCUMENTS

| | | | |
|---|---|---|---|
| 2008/0131624 A1* | 6/2008 | Egami | G06F 3/045 428/1.1 |
| 2009/0284475 A1* | 11/2009 | Nashiki | G06F 3/045 345/173 |
| 2011/0285637 A1 | 11/2011 | Karkkainen | |
| 2011/0285667 A1 | 11/2011 | Poupyrev et al. | |
| 2012/0128960 A1* | 5/2012 | Busgen | F15D 1/12 428/220 |
| 2013/0106758 A1* | 5/2013 | Radivojevic | G06F 3/044 345/174 |
| 2014/0146454 A1 | 5/2014 | Nozawa | |
| 2014/0345917 A1* | 11/2014 | Takada | G06F 3/0412 174/255 |
| 2015/0103024 A1 | 4/2015 | Haga et al. | |
| 2015/0177906 A1* | 6/2015 | Yairi | G06F 3/016 345/648 |
| 2015/0239023 A1 | 8/2015 | Iwata et al. | |

FOREIGN PATENT DOCUMENTS

| | | |
|---|---|---|
| JP | 2014052432 A | 3/2014 |
| JP | 2013-213009 | 5/2015 |
| JP | 2015-097076 A | 5/2015 |
| WO | 2013015039 A1 | 1/2013 |
| WO | 2013099994 A1 | 7/2013 |

OTHER PUBLICATIONS

Notice of Reasons for Refusal dated Jul. 9, 2019 from the Japanese Patent Office in application No. 2016-001986.

* cited by examiner

FIG. 6

| REFERENCE NUMBER | THE NAME OF SAMPLE | PRESENCE/ABSENCE OF THE ANTIGLARE LAYER | SURFACE ROUGHNESSES Ra (μm) | SURFACE ROUGHNESSES Ry (μm) | SURFACE ROUGHNESSES Rz (μm) | DETECTION THRESHOLD VOLTAGE (AN AVERAGE VALUE OF 4 TIMES) |
|---|---|---|---|---|---|---|
| 1 | 0801-11-15 | ABSENCE | 0.00 | 0.00 | 0.00 | 178.4 |
| 2 | 0801-12-10 | PRESENCE | 0.0006 | 0.1492 | 0.1009 | 89.8 |
| 3 | 0801-10-13 | PRESENCE | 0.0486 | 0.3078 | 0.2046 | 78.4 |
| 4 | 0801-12-14 | PRESENCE | 0.0603 | 0.3191 | 0.2238 | 67.8 |
| 5 | 0801-11-13 | PRESENCE | 0.0664 | 0.3892 | 0.3273 | 68.8 |
| 6 | 0801-10-11 | PRESENCE | 0.0983 | 0.6296 | 0.4442 | 82.6 |
| 7 | 0801-12-16 | PRESENCE | 0.1375 | 0.8001 | 0.6077 | 99.6 |
| 8 | 0801-12-11 | PRESENCE | 0.1519 | 0.9479 | 0.6855 | 89.2 |
| 9 | 0801-11-9 | PRESENCE | 0.2392 | 1.6783 | 1.078 | 127.6 |

FIG. 8

| REFERENCE NUMBER | THE NAME OF SAMPLE | PRESENCE/ ABSENCE OF THE ANTIGLARE LAYER | SURFACE ROUGHNESSES Ra (μm) | DETECTION THRESHOLD VOLTAGE (AN AVERAGE VALUE OF 4 TIMES) | THE TACTILE SENSE AT THE TIME OF A ZERO SIGNAL VOLTAGE | | |
|---|---|---|---|---|---|---|---|
| | | | | | Sticky | FINE SENSE | ROUGH |
| 1 | 0801-11-15 | ABSENCE | 0.00 | 178.4 | ○ | | |
| 2 | 0801-12-10 | PRESENCE | 0.0206 | 89.8 | ○ | ○ | |
| 3 | 0801-10-13 | PRESENCE | 0.0486 | 78.4 | | ○ | |
| 4 | 0801-12-14 | PRESENCE | 0.0503 | 67.8 | ○ | ○ | |
| 5 | 0801-11-13 | PRESENCE | 0.0564 | 68.8 | ○ | ○ | |
| 6 | 0801-10-11 | PRESENCE | 0.093 | 82.6 | | ○ | |
| 7 | 0801-12-16 | PRESENCE | 0.1375 | 89.6 | | ○ | |
| 8 | 0801-12-11 | PRESENCE | 0.1519 | 89.2 | | ○ | |
| 9 | 0801-11-9 | PRESENCE | 0.2392 | 127.6 | | ○ | |
| 10 | KB-115 | ABSENCE | 0.4 | | | ○ | |
| 11 | KB-115 | ABSENCE | 0.8 | | | | ○ |
| 12 | KB-115 | ABSENCE | 1.6 | | | | ○ |
| 13 | KB-115 | ABSENCE | 3.2 | | | | ○ |

FIG. 9

| REFERENCE NUMBER | THE NAME OF SAMPLE | PRESENCE/ ABSENCE OF THE ANTIGLARE LAYER | SURFACE ROUGHNESSES Ra (μm) | SURFACE ROUGHNESSES Ry (μm) | SURFACE ROUGHNESSES Rz (μm) | DETECTION THRESHOLD VOLTAGE (AN AVERAGE VALUE OF 4 TIMES) | | | |
|---|---|---|---|---|---|---|---|---|---|
| | | | | | | A MAN OF 40'S | A MAN OF THE FIRST HALF OF 30'S | A MAN OF THE SECOND HALF OF 30'S | A WOMAN OF 20'S |
| 1 | 0801-11-15 | ABSENCE | 0.00 | 0.0024 | 0.0021 | 178.4 | 175 | 271.5 | 263.0 |
| 2 | 0801-12-10 | PRESENCE | 0.0206 | 0.1492 | 0.1009 | 89.8 | 93.5 | 210.5 | 180.5 |
| 3 | 0801-10-13 | PRESENCE | 0.0486 | 0.3078 | 0.2046 | 78.4 | 85 | 191.0 | 145.5 |
| 4 | 0801-12-14 | PRESENCE | 0.0503 | 0.3191 | 0.2238 | 67.8 | 80.5 | 162.0 | 107.5 |
| 5 | 0801-11-13 | PRESENCE | 0.0564 | 0.3892 | 0.3273 | 68.8 | 82 | 157.5 | 101.0 |
| 6 | 0801-10-11 | PRESENCE | 0.093 | 0.6296 | 0.4442 | 82.6 | 93.5 | 148.5 | 107.0 |
| 7 | 0801-12-16 | PRESENCE | 0.1375 | 0.8091 | 0.6077 | 99.6 | 97 | 176.5 | 100.5 |
| 8 | 0801-12-11 | PRESENCE | 0.1519 | 0.9479 | 0.6855 | 89.2 | 93.5 | 164.0 | 105.0 |
| 9 | 0801-11-9 | PRESENCE | 0.2392 | 1.6783 | 1.078 | 127.6 | 127.6 | 178.0 | 114.0 |

RELATION BETWEEN OUTPUT
AND THE DATA D[1:0]

ND METHOD

TACTILE SENSE PRESENTATION DEVICE, ELECTRONIC APPARATUS, AND METHOD OF DRIVING TACTILE SENSE PRESENTATION DEVICE

CROSS-REFERENCE TO RELATED APPLICATIONS

This non-provisional application claims priority under 35 U.S.C. § 119(a) on Patent Application No. 2015-064753 filed in Japan on Mar. 26, 2015, and Patent Application No. 2016-001986 filed in Japan on Jan. 7, 2016, the entire contents of which are hereby incorporated by reference.

FIELD

The present invention relates to a tactile sense presentation device, an electronic apparatus, and a method of driving a tactile sense presentation device, and more particularly, to a tactile sense presentation device presenting a tactile sense, an electronic apparatus such as a touch panel or a terminal for a visually-impaired person that includes the tactile sense presentation device, and a drive method for appropriately presenting a tactile sense.

BACKGROUND

A display device in which a touch panel, for which an input operation can be performed by touching it using a finger or the like, is mounted, by being built in a system controlling a display content and the operation of a device in accordance with an input operation, contributes to the realization of interactive operability enabling easy use. For this reason, information apparatuses such as a smartphone having a touch panel built therein, a tablet terminal, and a notebook personal computer have rapidly been spread widely.

Meanwhile, the surface of a display device having a touch panel mounted thereon is evenly hard, and a same tactile sense is acquired when any portion displayed on the screen is touched. For this reason, it is practically difficult to perceive portions of a touch panel for which an effective input can be made through a touch operation and whether or not an effective input is made without seeing the touch panel. Thus, it is difficult to operate such a device only depending on a tactile sense without seeing the screen of the display device.

In contrast to this, for example, a remote controller of a television receiver, a conventional mobile phone terminal (feature phone), a keyboard of a personal computer, and the like respectively include independent operation keys, and accordingly, the position of an operation key can be perceived depending on only a tactile sense, and, also when such an operation key is pressed, it can be perceived through a tactile sense. Thus, in a case where the positions and the arrangement of operation keys are memorized, it is not that difficult to operate the operation keys depending on only a tactile sense.

From such backgrounds, technologies for applying a tactile sense to a display device have been researched. Such technologies, for example, include a method of mechanically vibrating a display device using a piezoelectric device, an eccentric motor, or the like; a method of presenting a tactile sense (texture sense) when a device is traced using a finger by changing a frictional force between an operator's finger and a device using an electrostatic force, a so-called method using an electric vibration phenomenon; and a method of driving a nerve axon of a cutaneous mechanoreceptor of a user's finger by causing an electric current to flow through the finger.

Among such methods, relating to the method using the electric vibration phenomenon, for example, in Japanese Patent OPI Publication No. 2011-248884, a tactile sense presentation device has been proposed which includes a conductive face; an insulating face arranged on the conductive face and a controller configured such that a signal is coupled with a user being in contact with the device and thus, causing at least one finger of the user sliding on the insulating face to perceive a tactile sense.

A tactile sense presentation device using the electric vibration phenomenon includes an electrode and an insulating layer protecting the electrode and presents a tactile sense to an operator through the following mechanism when an operator's finger moves on the insulating layer.

(1) When a voltage signal is applied to the electrode, an electrostatic force is applied between the electrode and the operator's finger. The electrostatic force is constantly an attractive force, and the electrostatic force changes according to the frequency of the voltage signal.

(2) As a normal reaction applied between the operator's finger and the surface of the insulating layer changes according to a change in the electrostatic force, when the user slips his finger on the surface of the insulating layer, the frictional force changes according to the frequency of the voltage signal.

(3) The change in the frictional force changes a force applied in the shearing direction of the finger, and deformation of the finger according to the frequency of the voltage signal is caused. Such a deformation (mechanical vibration) is detected by a mechanoreceptor of the user's finger, and accordingly, a rough texture sense is perceived.

In order to allow a rough texture sense to be perceived as above, it is necessary to apply an appropriate voltage to the electrode such that an appropriate electrostatic force is applied between the electrode and the operator's finger. However, it is not easy to apply an appropriate voltage, and, when the voltage applied to the electrode is increased so as to allow a texture sense to be easily perceived, in a case where an insulating film protecting the electrode disappears due to abrasion or the like, a high voltage is applied to the operator's finger, and there is concern that an inappropriate current flows through the operator's finger, and it is not desirable from the viewpoint of safety. On the other hand, when the voltage applied to the electrode is decreased, a sufficient texture sense cannot be perceived.

Particularly, a contact face (the surface of the insulating layer) of a conventional tactile sense presentation device is flat, and, in case of the flat contact face, the finger is tightly brought into contact with the contact face and is difficult to slide, whereby it is difficult to perceive a texture sense. For this reason, it is necessary to further increase the voltage applied to the electrode, and it is difficult to secure the safety. Accordingly, there is a problem in that it is difficult to achieve both easy perception of a texture sense and a decrease in the voltage applied to the electrode.

The present invention is made in consideration of the problems described above, and a main object thereof is to provide a tactile sense presentation device capable of allowing a texture sense to be easily perceived and effectively decreasing the voltage applied to the electrode, an electronic apparatus including the tactile sense presentation device, and a method of driving a tactile sense presentation device.

SUMMARY

According to one aspect of the present invention, a tactile sense presentation device includes a panel that includes a support substrate, an electrode formed on the support substrate, and an insulating layer covering the electrode, and a drive unit that drives the panel, a tactile sense is presented to an operator based on an electrostatic force generated between the electrode and the operator by the drive unit applying a signal of a voltage to the electrode, a contact face of the insulating layer that is in contact with the operator has a surface roughness Ra of a predetermined range, and the voltage applied to the electrode is a voltage corresponding to the surface roughness Ra of the contact face.

According to one aspect of the present invention, a tactile sense presentation device includes a panel that includes a support substrate, a plurality of electrodes formed on the support substrate and extending in a predetermined direction, and an insulating layer covering the plurality of electrodes and a drive unit that drives the panel, a tactile sense is presented to an operator based on an electrostatic force generated between the electrodes and the operator by the drive unit applying a signal of a voltage to the electrodes, a contact face of the insulating layer that is in contact with the operator has a surface roughness Ra of a predetermined range, and the voltage applied to the electrodes corresponding to an area in which the tactile sense is presented to the operator is a voltage corresponding to the surface roughness Ra of the contact face.

According to one aspect of the present invention, a tactile sense presentation device includes a panel that includes a support substrate, an electrode formed on the support substrate, and an insulating layer covering the electrode; and a drive unit that drives the panel, a tactile sense is presented to an operator based on an electrostatic force generated between the electrode and the operator by the drive unit applying a signal of a voltage to the electrode, there is a correlation between a surface roughness Ra of a contact face of the insulating layer that is in touch with the operator and a lowest voltage (hereinafter, referred to as a detection threshold voltage) for which the operator can perceive a tactile sense, and the contact face has the surface roughness Ra having the detection threshold voltage lower than the detection threshold voltage at the time of a surface roughness Ra of 0.00 μm.

According to one aspect of the present invention, there is provided an electronic apparatus including the tactile sense presentation device described above on a front face or a rear face of a display apparatus of a touch panel type.

According to one aspect of the present invention, a method of driving a tactile sense presentation device that includes a panel that includes a support substrate, an electrode formed on the support substrate, and an insulating layer covering the electrode and a drive unit that drives the panel, and presents a tactile sense to an operator based on an electrostatic force generated between the electrode and the operator by applying a signal of a voltage to the electrode by using the drive unit, the method includes a surface roughness Ra of a contact face of the insulating layer that is in contact with the operator being set to a predetermined range, and the drive unit performs applying a signal of a voltage corresponding to the surface roughness Ra of the contact face to the electrode.

According to one aspect of the present invention, a method of driving a tactile sense presentation device that includes a panel that includes a support substrate, a plurality of electrodes formed on the support substrate and extending in a predetermined direction, and the insulating layer covers the plurality of electrodes and a drive unit that drives the panel, and presents a tactile sense to an operator based on an electrostatic force generated between the electrodes and the operator by applying a signal of a voltage to the electrodes by using the drive unit, the method includes a surface roughness Ra of a contact face of the insulating layer that is in contact with the operator being set to a predetermined range, and the drive unit performs, specifying an electrode corresponding to an area in which a tactile sense is presented to the operator and applying the signal of a voltage corresponding to the surface roughness Ra of the contact face to the specified electrode.

According to a tactile sense presentation device, an electronic apparatus, and a method of driving a tactile sense presentation device according to the present invention, a texture sense can be easily perceived, and a voltage applied to the electrode can be effectively decreased.

The reason for this is as follows. The surface roughness of the contact face of the tactile sense presentation device is set to a predetermined range, and there is a correlation between the surface roughness of the contact face and a voltage for which the texture sense can be perceived, and thus, a voltage (a voltage that is the voltage corresponding to the surface roughness or higher) corresponding to the surface roughness is applied to the electrode for driving the electrode.

In addition, the contact face has the surface roughness causing a detection threshold voltage lower than the detection threshold voltage at the time of a surface roughness of 0.00 μm.

BRIEF DESCRIPTION OF THE DRAWINGS

FIG. 6 is a table that illustrates an evaluation result of the tactile sense presentation device according to the first embodiment of the present invention;

FIG. 8 is a table that illustrates a relation among the surface roughness, a detection voltage, and a tactile sense perceived by an operator in the tactile sense presentation device according to the first embodiment of the present invention;

FIG. 9 is a table that illustrates a result of evaluations of the tactile sense presentation device according to the first embodiment of the present invention that are made by four test subjects;

DESCRIPTION OF EMBODIMENTS

Figure 1:
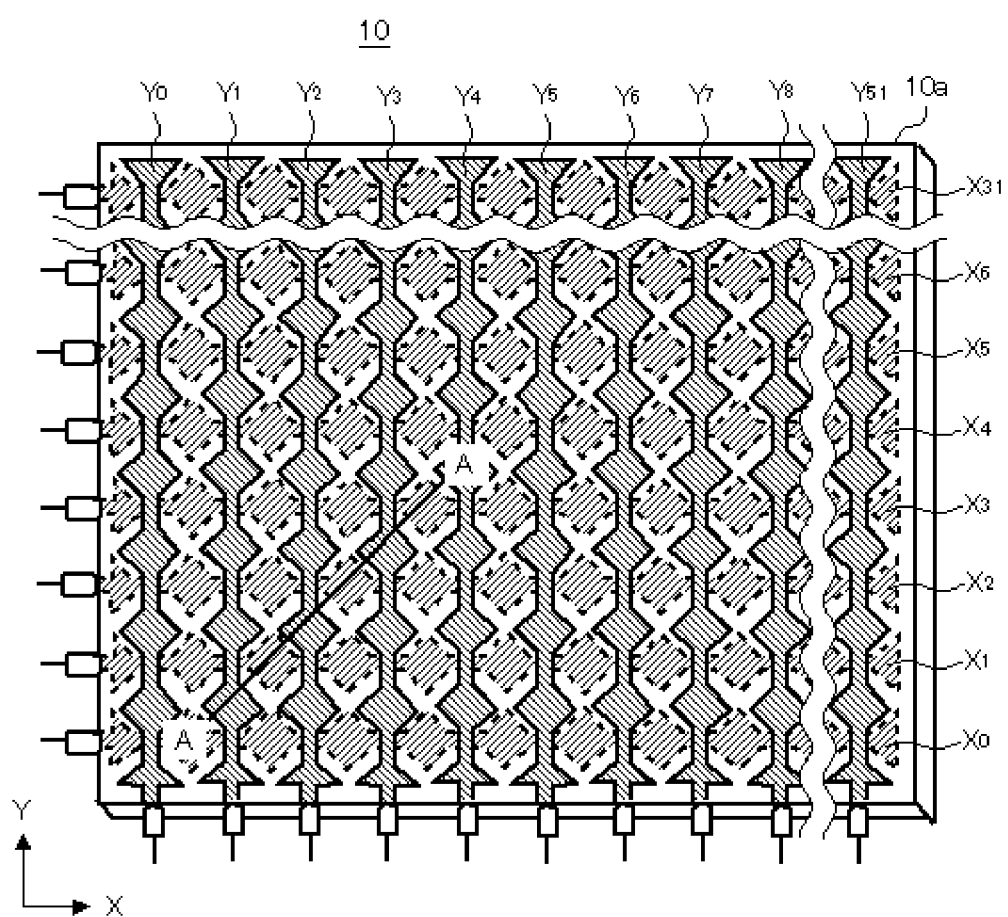
FIG. 1 is a planar view that illustrates an example of a tactile sense presentation device according to a first embodiment of the present invention.

As described above, while a tactile sense presentation device using the electric vibration phenomenon has been proposed, a contact face of a conventional tactile sense presentation device is flat, and, in case of the flat contact face, a finger is tightly brought into contact with the contact face and is difficult to slide, whereby it is difficult to perceive a texture sense depending on an electrostatic force. In order to allow the texture sense to be easily perceived, it is necessary to apply a high voltage of 100 V or higher to the electrodes. Accordingly, the drive circuit is complicated, and, in a case where an insulating film protecting the electrodes disappear by some accident of abrasion or the like, an inappropriate electric current flows through the finger, and thus, there is a problem in that the safety of the device cannot be secured.

Regarding this problem, the inventors of the present application generated various tactile sense presentation devices having mutually-different forms of contact faces and checked a detection threshold voltage for which a texture sense can be perceived by the operator in each of the tactile sense presentation devices. As a result, it was found that, by applying an antiglare process for the contact face (by forming the contact face of the insulating layer to be rough), a presented tactile sense could be checked very easily, in other words, a presented tactile stimulation could be perceived by the operator very easily (first finding).

The inventors of the present application, as a result acquired by a further experimentation, found that, an increase in the surface roughness of the contact face to a moderate degree through an antiglare process is a factor allowing the operator to easily perceive a tactile stimulus. In other words, it was found that there is a special correlation between the surface roughness of the contact face and a detection threshold voltage that is a lowest voltage for which the operator can perceive a texture sense for the surface roughness (second finding). The surface roughness used in the description presented here is an arithmetic average roughness (represented as a surface roughness Ra as is necessary) defined in annexes of JIS B 0031 and JIS B 0061 and the like. This arithmetic average roughness is acquired by folding a roughness curve at the center line and representing a value acquired by dividing an area acquired by the roughness curve and the center line by a length L in units of micrometers (μm). In addition, instead of the arithmetic average roughness, a maximal height (surface roughness Ry), a ten-point average roughness (surface roughness Rz), or the like defined in the annex of JIS B 0601 and the like may be used. The maximal height is acquired by extracting only a reference length from the roughness curve and representing an interval between the mountain top line and the valley bottom line of the extracted portion in units of micrometers (μm). In addition, the ten-point average roughness is acquired by extracting only a reference length from the roughness curve and representing a sum of the average value of the absolute values of elevations from the highest mountain top to a fifth mountain top and an average value of the absolute values of elevations from the lowest valley bottom to a fifth valley bottom in units of micrometers (μm).

Then, based on the first finding, by setting the surface roughness of the contact face to an appropriate range and, based on the second finding, by applying a voltage (in other words, a voltage that is a detection threshold voltage corresponding to the surface roughness, which is necessarily derived from the special correlation described above, or higher) corresponding to the surface roughness to the electrodes or by configuring the contact face to have a surface roughness causing a detection threshold voltage to be lower than a detection threshold voltage at the time of a surface roughness of 0.00 μm, a texture sense can be easily perceived, and a voltage applied to the electrodes can be effectively decreased, whereby both the securement of the safety and the improvement of the tactile sensitivity of the texture sense can be achieved.

Hereinafter, the contents of tests allowing the inventors of the present application to arrive at the first and second findings will be described more specifically.

[First Embodiment]

In the following tests, a sample having a flat contact face and samples having fine irregularities of various surface roughnesses formed on the contact faces are prepared, detection threshold voltages are measured for such samples, and the detection threshold voltages are compared with each other and reviewed.

(Trial Production of Sample)

FIG. 1 is a planar view that illustrates an example of a panel 10a of a tactile sense presentation device 10 that is a trial product. In producing the tactile sense presentation device 10, on a support substrate formed using a transparent insulating material such as glass, a plurality of X electrodes (in the drawing, 32 X electrodes of X0 to X31) extending in a direction (here, the horizontal direction in the drawing) parallel to the X axis and a plurality of Y electrodes (52 Y electrodes of Y0 to Y51 in the drawing) extending in a direction (here, the vertical direction in the drawing) parallel to the Y axis are formed. The X electrodes and the Y electrodes are formed using indium tin oxide (ITO) and are formed to be transparent for visible light. In addition, an insulating layer is formed between the X electrodes and the Y electrodes such that the X electrodes and the Y electrodes are insulated from each other by the insulating layer at intersections thereof. Furthermore, in an upper layer of the X electrodes and the Y electrodes, another insulating layer is formed. The surface of this insulating layer 16 serves as a contact face 17 to be touched by an operator's finger.

Figure 2:
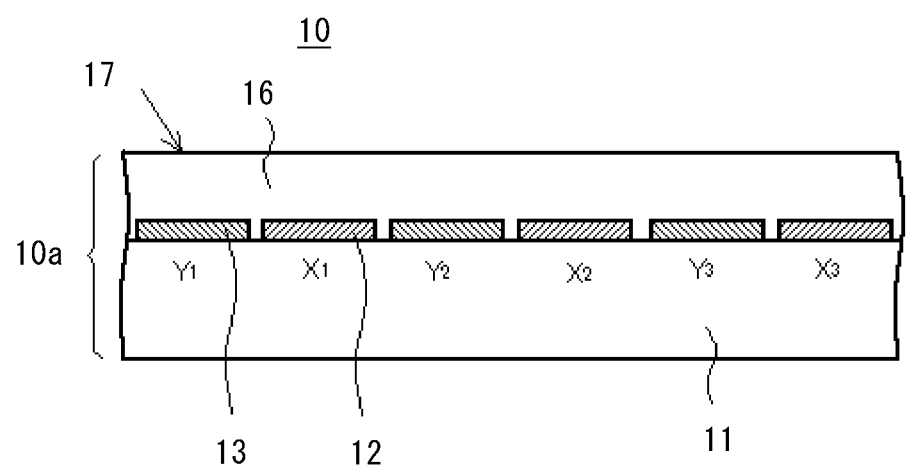
FIG. 2 is a cross-sectional view of the tactile sense presentation device according to the first embodiment of the present invention and illustrates a cross-section taken along line A-A illustrated in FIG. 1.

FIG. 2 illustrates a cross-sectional view taken along line A-A illustrated in FIG. 1. In the tactile sense presentation device 10, X electrodes 12 and Y electrodes 13 are alternately arranged on a support substrate 11, and an insulating layer (not illustrated in the drawing) is formed between the X electrodes 12 and the Y electrodes 13. A detailed structure of portions at which the X electrodes 12 and the Y electrodes 13 intersect each other will be described in a second example to be described later. The insulating layer 16 covering the X electrodes 12 and the Y electrodes 13 is formed using an acrylic resin, and the surface roughness Ra thereof is 0.00 μm (almost flat). The surface of the insulating layer 16 serves as a contact face 17. The structure and the manufacturing method of this sample are similar to those disclosed in a prior application (Patent Application No. 2013-213009) of the inventors of the present application and will be described in detail in examples to be described later.

Figure 3:
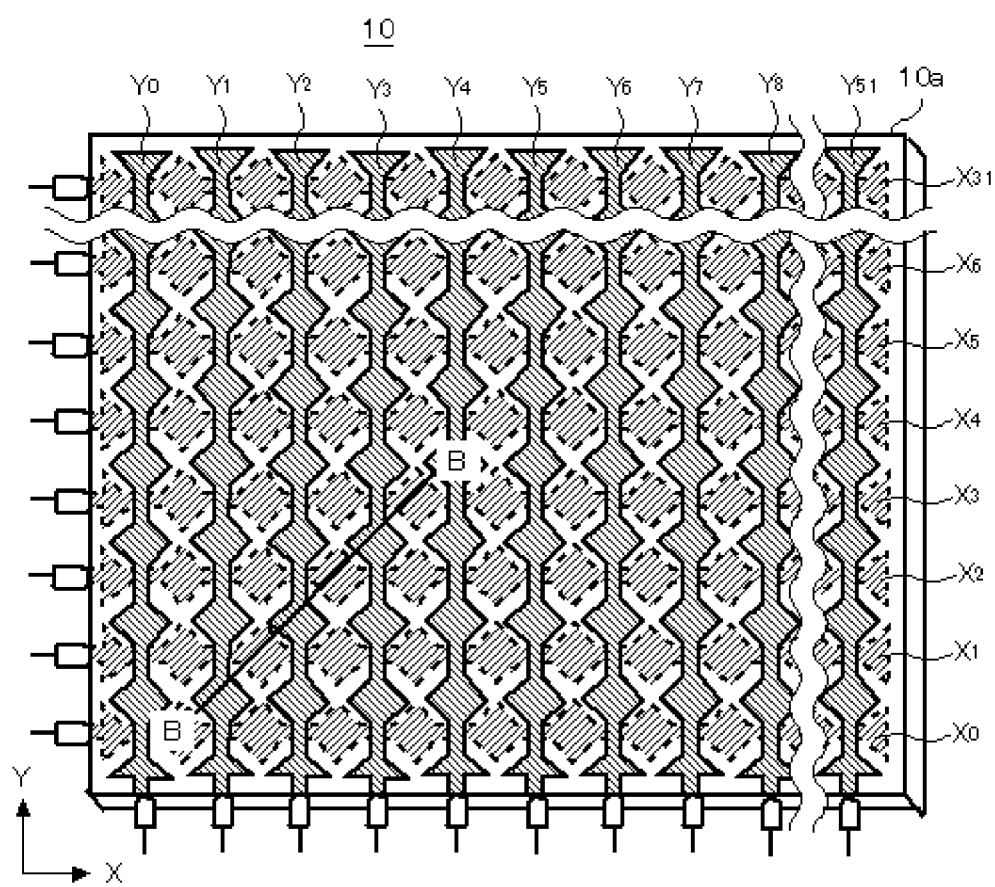
FIG. 3 is a planar view that illustrates another example of the tactile sense presentation device according to the first embodiment of the present invention.
Figure 4:
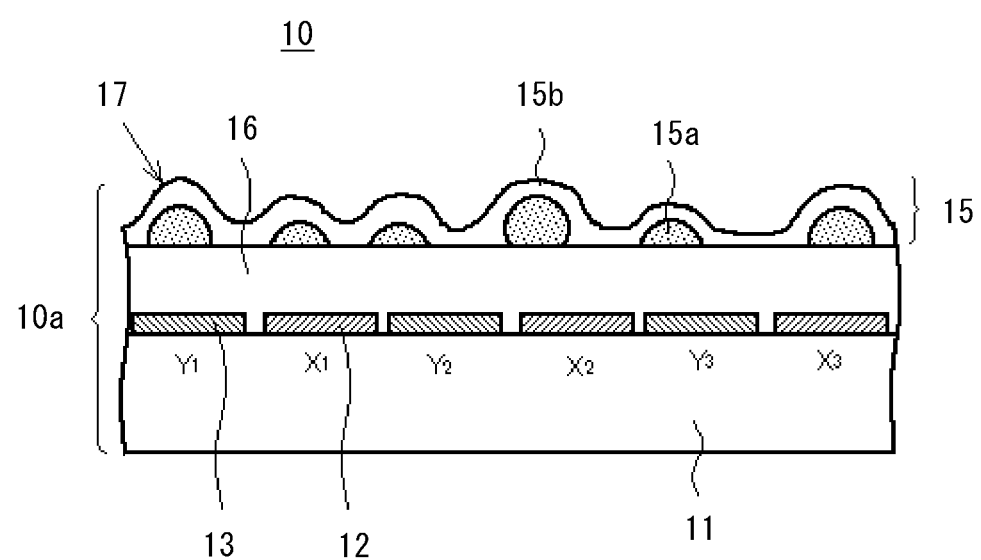
FIG. 4 is a cross-sectional view of the tactile sense presentation device according to the first embodiment of the present invention and illustrates a cross-section taken along line B-B illustrated in FIG. 3.

FIG. 3 is a planar view of a panel 10a of another tactile sense presentation device 10 that is a trial product, and FIG. 4 is a cross-sectional view taken along line B-B illustrated in FIG. 3.

This tactile sense presentation device 10 has many elements that are in common with the tactile sense presentation device 10 illustrated in FIGS. 1 and 2, and the description of the common elements will not be presented. As illustrate in FIG. 4, a main difference is that an antiglare layer (insulating layer) 15 having a reflection prevention function for visible light is formed in a further upper layer of the insulating layer 16, and the surface of the antiglare layer 15 serves as a contact face 17.

This antiglare layer 15 is formed by performing spray coating of the surface of the insulating layer 16 with a coating layer material 15b that is in solution having an insulating property such as a resin in which particles 15a formed using an insulating material such as silica of a predetermined size are dispersed and performing drying and a hardening process of the coating layer. Then, by changing the content ratio of the particles 15a to the coating layer material 15b, a spraying method, the material, the size, and the shape of the particles 15a, the material, the viscosity, and the like of the coating layer material 15b, a plurality of tactile sense presentation devices 10 having mutually-different properties and states (surface roughness) of the antiglare layers 15 are produced as trial products.

(Evaluation Sample)

Figure 5:
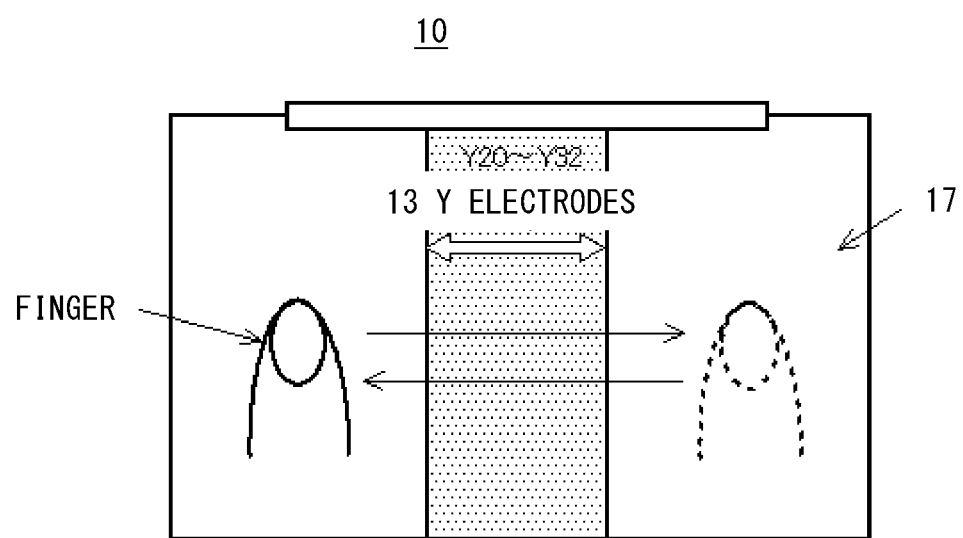
FIG. 5 is a diagram that illustrates a method of evaluating the tactile sense presentation device according to the first embodiment of the present invention.

FIG. 5 illustrates an overview of a method of evaluating each of the tactile sense presentation devices 10 that are produced as the trial products. Among the plurality of X electrodes 12 and the plurality of Y electrodes 13, an AC voltage signal having a sinusoidal shape is applied to 13 Y electrodes 13 of Y20 to Y32, and the remaining Y electrodes 13 and all the X electrodes 12 are connected to the ground. In a case where the voltage amplitude of the voltage signal is sufficiently high, when the contact face 17 is traced using a finger (the finger slides on the contact face 17), a rough texture sense is felt in an area (an area to which hatching is applied) to which the voltage signal is applied. From this state, the voltage amplitude of the voltage signal applied to the Y electrodes 13 is gradually decreased, and a lowest voltage for which a difference in the tactile sense is considered to be identifiable between an area to which the voltage signal is applied and the other area is recorded. The voltage recorded here is set to be a peak-to-peak value of the AC voltage signal having a sinusoidal shape. This value is a value that is twice a value generally regarded to be the amplitude of an AC voltage signal having a sinusoidal shape. This voltage is a detection threshold voltage, and the detection threshold voltage is measured for each of the plurality of tactile sense presentation devices 10 produced as trial products.

FIG. 6 illustrates a result of evaluations of the plurality of tactile sense presentation devices 10. A sample of reference number 1 is a sample having a surface roughness Ra of 0.00 μm (a sample having a flat contact face 17) illustrated in FIGS. 1 and 2, and samples of reference numbers 2 to 9 are samples each having a contact face 17 configured by the antiglare layer 15 illustrated in FIGS. 3 and 4. In the sample (the sample of reference number 1) that has no antiglare layer 15 and has the flat contact face 17, while an average value of the detection threshold voltage is 178.4 V, in the samples (samples of reference numbers 2 to 9) each having the antiglare layer 15 disposed therein, the detection threshold voltages are in the range of 67.8 V to 127.6 V. Thus, it has been proved that the antiglare layer 15 is effective for decreasing the drive voltage.

From this, it is understood that a tactile sense of an area in which a voltage signal is not applied to the electrodes, in other words, the tactile sense of the material state of the contact face 17 of the tactile sense presentation device 10 has a big influence on the sensitivity of the tactile sense presented by applying a voltage signal to the electrodes. In other words, it is understood that the tactile sense of the background area in which a voltage signal is not applied to the electrodes has a big influence on the sensitivity of the tactile sense presented by applying a voltage signal to the electrodes.

For example, in the sample of reference number 1, in an area in which a voltage signal is not applied to the electrodes, a contact area between a finger and the contact face becomes relatively large, and thus, a sense of the finger being stuck to the contact face (sticky) is felt. In addition, the tactile sense of an area in which a voltage signal is applied to the electrodes is similarly sticky, and it is difficult to identify a difference between both the tactile senses. On the other hand, in the samples of reference numbers 2 to 9 in which the antiglare layer 15 is disposed, the tactile sense of the material state of the contact face 17 of the tactile sense presentation device 10 is smooth and dry, and, in a case where the tactile sense of the material state is smooth and dry, the rough sense of the area in which a voltage signal is applied to the electrodes is sensitive.

As reasons for the occurrence of such a phenomenon, the following two reasons are considered.

(1) When a finger continuously slides from the area in which a voltage signal is not applied to the electrodes over the area in which a voltage signal is applied to the electrodes, the smooth and dry tactile sense of the background emphasizes a rough tactile sense.

(2) Even in a case where an attractive force according to an electrostatic force is changed in the same manner by applying a same voltage signal to electrodes disposed in a lower layer of the contact face 17 of which the material state is sticky and electrodes disposed in a lower layer of the contact face 17 having a smooth and dry tactile sense, the contact face 17 having the smooth and dry tactile sense is more sensitive to a rough feeling. On the contact face 17 of which the material state is sticky, even the operator is in the middle of sliding the finger on the contact face 17, the sliding is unintentionally stopped. For this reason, a frictional force generated according to a normal reaction applied between the operator's finger and the surface of the insulating layer includes a component to which a static friction coefficient contributes. On the other hand, on the contact face 17 of which the material state has a smooth and dry tactile sense, the finger smoothly slides on the contact face 17. Accordingly, a component to which a static friction coefficient contributes is not included in a frictional force generated according to a normal reaction applied between the operator's finger and the surface of the insulating layer, and a component to which a dynamic friction coefficient contributes is dominant.

By examining the detection threshold voltages acquired in the samples of reference numbers 2 to 9, in which the antiglare layer 15 is disposed, represented in a table illustrated in FIG. 6, it can be understood that there is a special correlation between the magnitude of the surface roughness Ra and the detection threshold voltage. In other words, in a case where the surface roughness Ra is more than 0.0206 μm, the detection threshold voltage gradually decreases, and the detection threshold voltage is minimal in the sample (the sample of reference number 4) having a surface roughness Ra of 0.0503 μm. In addition, in a case where the surface roughness Ra is more than 0.0503 μm, the detection threshold voltage gradually increases. From this, it has been found that the detection threshold voltage is changed more depending on the surface roughness Ra of the contact face 17 than depending on the presence/absence of the antiglare layer 15, and a minimal value is present in the detection threshold voltage.

Figure 7:
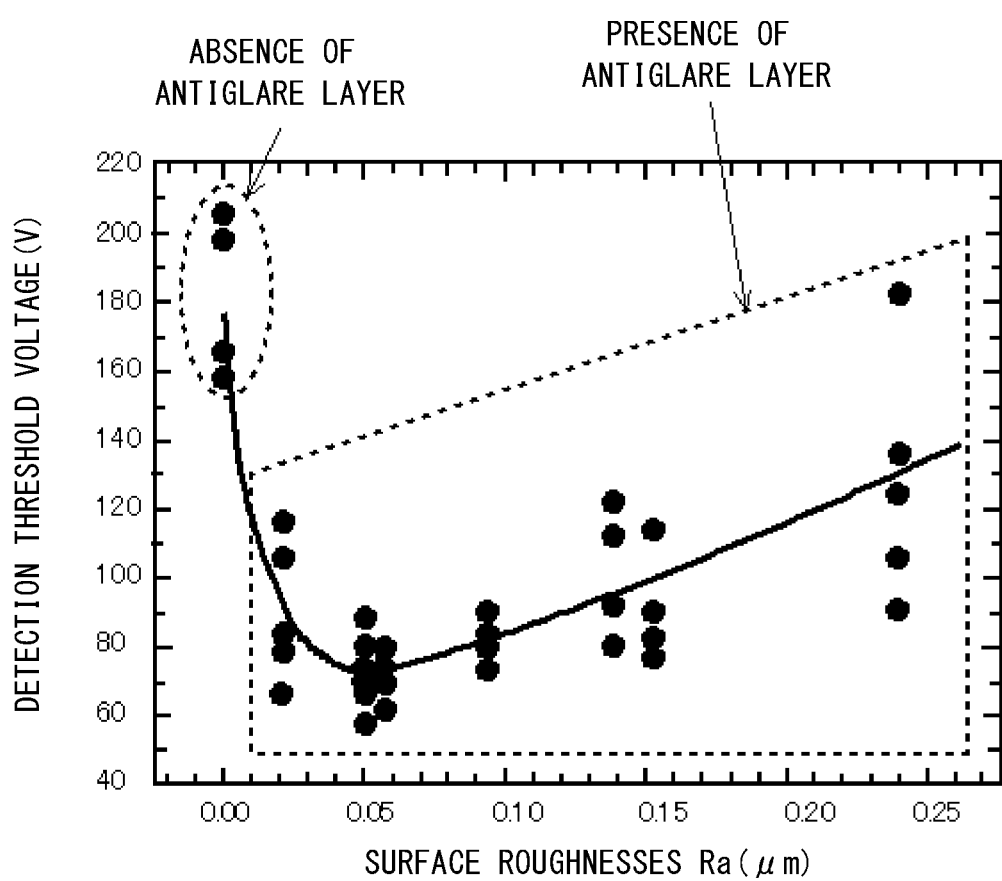
FIG. 7 is a graph that illustrates a relation between the surface roughness and the detection threshold voltage of the tactile sense presentation device according to the first embodiment of the present invention.

FIG. 7 is a graph that illustrates relations between the surface roughnesses Ra and the detection threshold voltages of all the samples illustrated in FIG. 6. It can be understood that, by configuring the surface roughness Ra to be more than 0.01 μm, an effect of decreasing the detection threshold voltage is acquired. In addition, it can be understood that, in a case where the surface roughness Ra is more than 0.05 μm, the detection threshold voltage tends to increase. The reasons for the occurrence of the phenomenon of an increase in the detection threshold voltage are considered as below. In a case where the surface roughness Ra becomes too high, the tactile sense of the surface of the material state of the contact face 17 is rough, and it is difficult to discriminate the tactile sense of the surface from the rough sense of the presented tactile sense. In addition, in a case where the surface roughness Ra becomes high, the finger is deformed to follow the irregularities of the contact face 17 and is caught in a protruded portion of the contact face 17 so as not to easily slide, and thus, it is difficult to feel a change in the tactile sense.

By referring to the graph illustrated in FIG. 7, in a case where a tactile sense presentation device having a detection threshold voltage lower than that of the tactile sense presentation device of reference number 1, for example, a tactile sense presentation device having a detection threshold voltage of 150 V or lower is desired to be designed, it is preferable to set the surface roughness Ra to a range of 0.01 μm to 0.3 μm. In addition, in a case where a tactile sense presentation device having a detection threshold voltage lower than 178.4 V that is the detection threshold voltage of the tactile sense presentation device of reference number 1 is desired to be designed, it is preferable to set the surface roughness Ra to a range of 0.01 μm to 0.4 μm.

A result of a further examination of the relation among the surface roughness Ra, the detection threshold voltage, and the tactile sense felt by the operator is illustrated in FIG. 8. In the antiglare layer 15 formed using the coating layer material 15*b* in the solution that includes the particles 15*a*, the surface roughness Ra cannot be configured to be very high, and thus, in FIG. 8, the antiglare layer 15 is not arranged, and a tactile sense felt by the operator is written also for a sample (KB-115 in the drawing) using a member of a surface roughness Ra of 0.4 μm to 3.2 μm as the insulating layer 16.

Under a condition that the voltage amplitude of the voltage signal applied to the electrode is zero, a sticky sense is felt in a case where the surface roughness Ra is 0.00 μm, a smooth and dry sense is felt in a case where the surface roughness Ra is 0.0206 μm to 0.4 μm, and a rough sense is felt in a case where the surface roughness Ra is 0.8 μm or more. In a case where the surface roughness Ra is 0.8 μm or more, in addition to the feeling of the tracing finger being rough, a frictional force is felt to be large, and accordingly, an effect of decreasing the detection threshold voltage cannot be expected. In addition, in a case where the surface roughness Ra exceeds 0.8 μm, the impression of the tactile sense of the material state is not good. Thus, it is preferable that the surface roughness Ra is set to be less than 0.8 μm.

In addition, in FIG. 8, also for a sample (a sample of reference number 5) having a surface roughness Ra of 0.0564 μm, the presence of a sticky feeling is recorded. A sticky sense may be generated due to an ambient temperature, ambient humidity, the amount of moisture of the tip of the finger, a pressing force of the finger, and the like. In a case where such a sticky sense is generated, the detection threshold voltage instantly increases, and thus, it is preferable to set the surface roughness Ra to be higher than 0.05 μm.

Based on the test result described above and the graph illustrated in FIG. 7, in order to effectively decrease the detection threshold voltage while a state in which a texture sense can be easily perceived is maintained, it is significant to set the surface roughness Ra to a range higher than 0.01 μm and lower than 0.8 μm, and more preferably, to a range higher than 0.05 μm and lower than 0.8 μm. This range of the surface roughness Ra may be paraphrased as a range rougher than a state in which the operator's finger is stuck to the contact face as the contact area between the contact face of the insulating layer that is in touch with the operator and the operator's finger becomes relatively large and is finer than a state in which the operator's finger is deformed to follow the irregularities of the contact face. In addition, since there is a special correlation between the surface roughness Ra of the contact face 17 and the detection threshold voltage, it is significant to set the voltage amplitude of a signal voltage applied to the electrode to a voltage corresponding to the surface roughness Ra of the contact face 17.

Thus, in one embodiment of the present invention, the antiglare layer 15 is formed such that the surface roughness Ra of the contact face 17 is in the predetermined range described above, and a voltage corresponding to the surface roughness Ra of the contact face 17 is applied to the electrode, and, more preferably, a voltage (while the upper limit is not particularly limited, from a viewpoint of securing the safety by decreasing the applied voltage, a voltage that is the applied voltage of a conventional device or less) that is the detection threshold voltage corresponding to the surface roughness Ra of the contact face 17 or higher is controlled to be applied to the electrode so as to drive the tactile sense presentation device 10. Accordingly, both the securement of the safety and the improvement of the perception sensitivity of the texture sense are achieved.

Here, the configuration and the control method of the tactile sense presentation device 10 may be appropriately changed as long as the surface roughness Ra of the contact face 17 is in the predetermined range described above, and the tactile sense presentation device is driven using a voltage (a voltage that is a detection threshold voltage corresponding to the surface roughness Ra of the contact face 17 or higher) corresponding to the surface roughness Ra of the contact face 17.

For example, in this embodiment, while the antiglare layer 15 formed using the coating layer material 15b including the particles 15a is arranged in the uppermost layer, irregularities having a surface roughness to be in the predetermined range described above may be formed on the contact face 17, and the antiglare layer 15 may be omitted.

In addition, by forming the insulating layer 16 that is the upper layer of the X electrodes 12 and the Y electrodes 13 using SiO2 or the like and etching the insulating layer 16 to be non-uniform through wet etching using hydrofluoric acid or the like, irregularities having the desired surface roughness can be formed on the contact face 17. In addition, by partly shaving off the surface of the insulating layer 16 through sand blasting or the like, irregularities having the desired surface roughness can be formed on the contact face 17.

Figure 25:
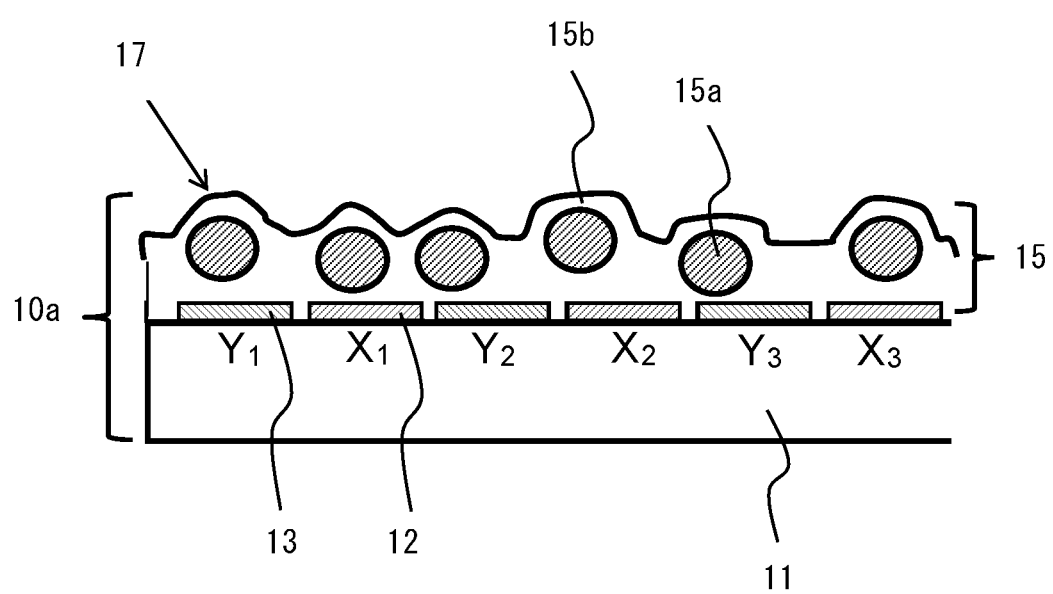
FIG. 25 is a cross-sectional view of a tactile sense presentation device according to a modified example of the first embodiment of the present invention.

In this embodiment, while the insulating layer 16 is formed in the upper layer of the X electrodes 12 and the Y electrodes 13, in a case where the coating layer material 15b has viscosity of some degree, and a thickness corresponding to a thin portion of the coating layer material 15b can be secured, as illustrated in FIG. 25, the insulating layer 16 may be omitted, and the antiglare layer 15 may be directly formed in the upper layer of the X electrodes 12 and the Y electrodes 13.

In the case illustrated in FIG. 4, while the particles 15a have been described as sphere bodies having a uniform diameter, as long as the surface roughness is in the predetermined range described above, the sphere bodies having non-uniform diameters may be mixed, and the sphere bodies may have a flat shape, a cylindrical shape, a shape that is partly sharpened shape, or the like. In addition, in the case illustrated in FIG. 4, while the contact face 17 has gentle irregularities, a shape acquired by sharpening the tip ends of convex portions may be employed.

Furthermore, by dipping a resin sheet in a solution, forming an antiglare layer on the surface of the resin sheet, and pasting the resin sheet into the insulating layer 16, an antiglare layer may be formed on the contact face.

The inventors of the present application made evaluations that are the same as the evaluation of the samples described above with reference to FIGS. 5 to 8 with test subjects added. The detection threshold voltages illustrated in FIGS. 6 to 8 and the tactile sense at the time of a zero signal voltage are results acquired when a man of 40's is a test subject. The added test subjects are three persons including a man of the first half of 30's, a man of the second half of 30's, and a woman of 20's.

FIG. 9 illustrates the detection threshold voltages of a total of four persons including the man of 40's and the added three test subjects. As a characteristic common to all the four persons, the detection threshold voltage of a sample (a sample of reference number 1) having no antiglare layer 15 and a flat contact face 17 is higher than the detection threshold voltages of the other samples (reference numbers 2 to 9) each having a certain antiglare layer 15 arranged therein. Based on this result, it has been turned out that the antiglare layer 15 is effective for decreasing the drive voltage.

In addition, as the surface roughness Ra is higher than 0.0206 μm, the detection threshold voltage gradually decreases, and the detection voltage is minimal in the sample of reference number 4 having a surface roughness Ra of 0.0503 μm in case of the man of 40's and the man of the first half of 30's, the sample of reference number 6 having a surface roughness Ra of 0.093 μm in case of the man of the second half of 30's, and the sample of reference number 7 having a surface roughness Ra of 0.1375 in case of the woman of 20's. In a case where the surface roughness Ra is higher than the surface roughness Ra for which the minimal detection threshold voltage is acquired for each test subject, the detection threshold voltage gradually increases. Based on the result described above, it has been found that the detection threshold voltages detected for all the test subjects change depending on the surface roughness Ra, and minimum values thereof are present.

Figure 10:
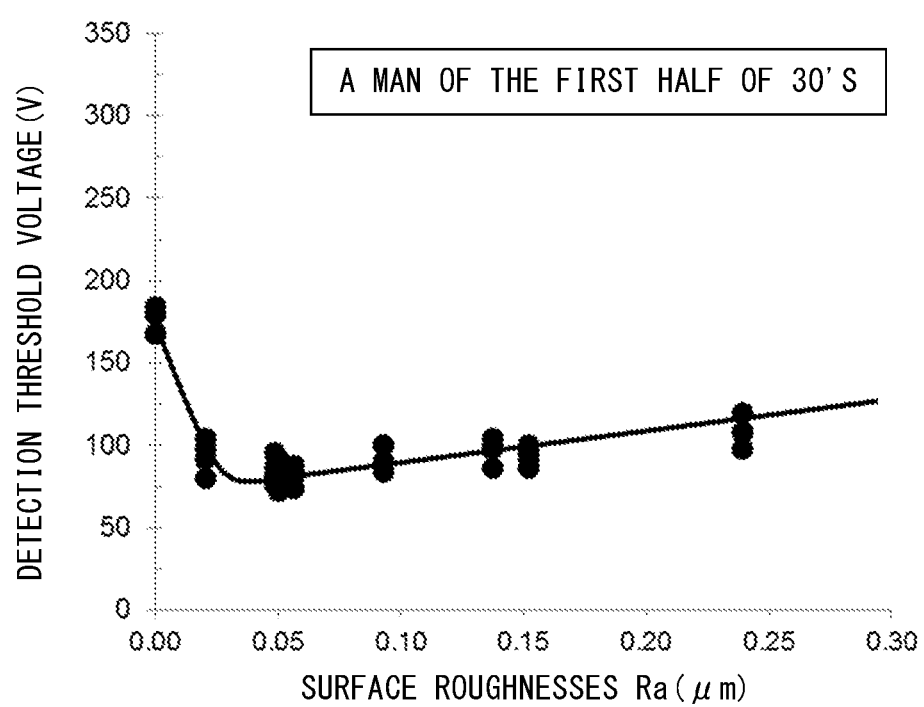
FIG. 10 is a graph that illustrates a relation between the surface roughness and the detection threshold voltage of the tactile sense presentation device according to the first embodiment of the present invention that is a result of a test targeted for men of early 30's.
Figure 11:
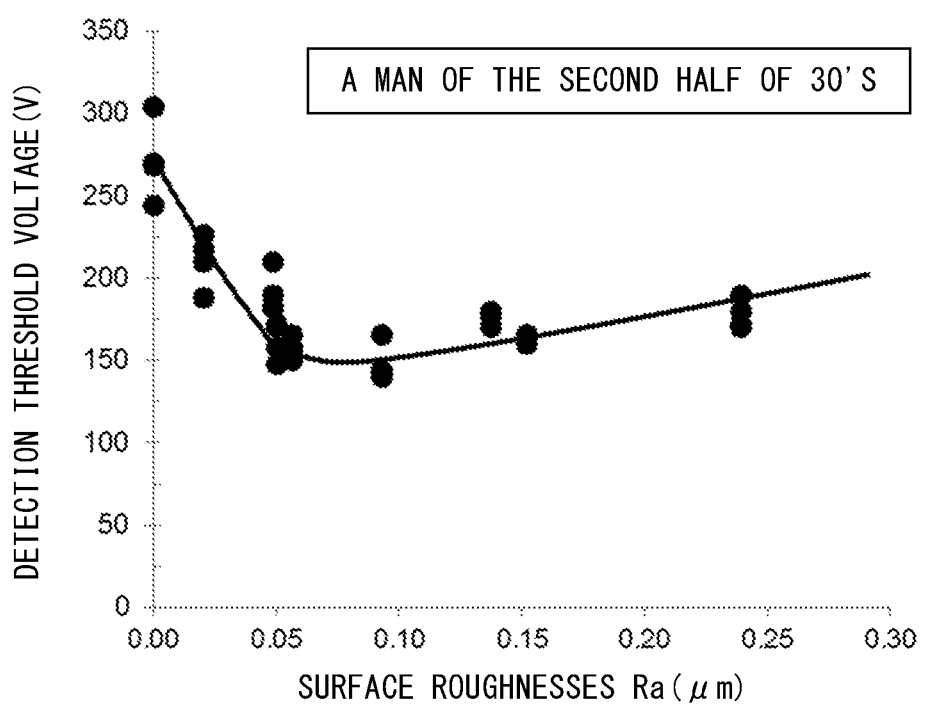
FIG. 11 is a graph that illustrates a relation between the surface roughness and the detection threshold voltage of the tactile sense presentation device according to the first embodiment of the present invention that is a result of a test targeted for men of late 30's.
Figure 12:
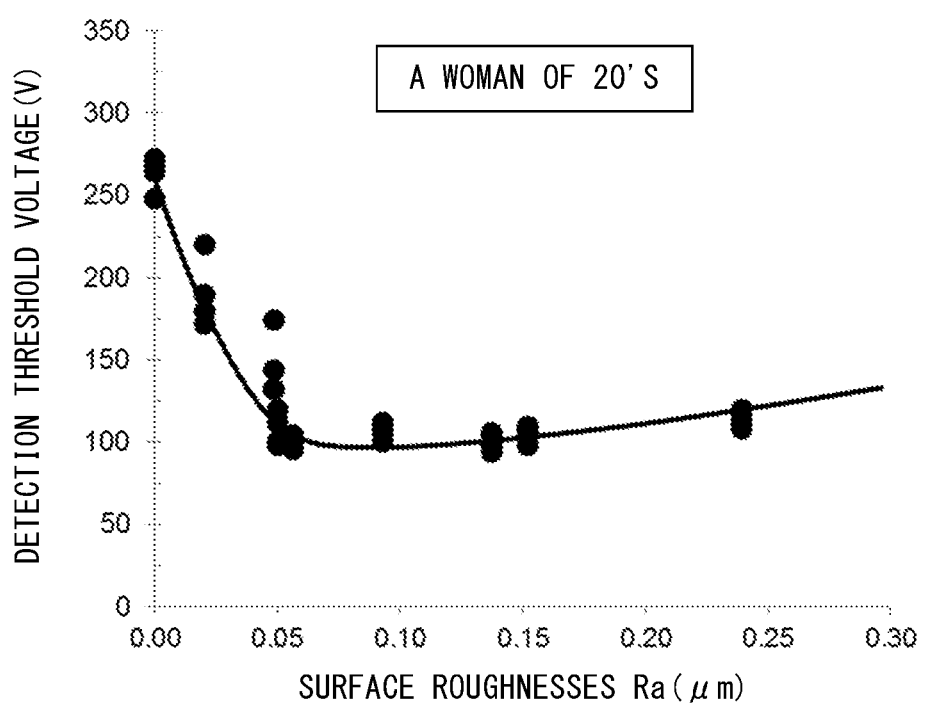
FIG. 12 is a graph that illustrates a relation between the surface roughness and the detection threshold voltage of the tactile sense presentation device according to the first embodiment of the present invention that is a result of a test targeted for women of 20's.

Graphs acquired by plotting the relations between the surface roughnesses Ra and the detection threshold voltages of the added three test subjects and giving approximation curves thereof are illustrated in FIGS. 10, 11, and 12. FIG. 10 illustrates the detection threshold voltage of the man of the first half of 30's, FIG. 11 illustrates the detection threshold voltage of the man of the second half of 30's, and FIG. 12 illustrates the detection threshold voltage of the woman of 20's. From these drawings, it can be understood that, by setting the surface roughness Ra to be higher than 0.01 μm, an effect of decreasing the detection threshold voltage is acquired, and, in an area in which the surface roughness Ra is higher than the surface roughness Ra at which the detection threshold voltage is worst, the detection threshold voltage tends to increase. This trend can be seen also in the relation between the surface roughness Ra and the detection threshold voltage of the man of 40's illustrated in FIG. 7. In other words, in the results of evaluations of all the four test subjects, the same trend is checked.

By referring to the approximation curves illustrated in FIGS. 7 and 10 to 12, the surface roughnesses Ra at which the detection threshold voltages are minimal are sequentially 0.05 μm, 0.03 μm, 0.075 μm, and 0.08 μm, and, while an individual difference in the detection threshold voltages of the four persons is recognized, in order to decrease the detection threshold voltage, it is preferable to set the surface roughness Ra to be higher than 0.03 μm.

Relating to the tactile sense at the time of a zero signal voltage described with reference to FIG. 8, the results of evaluations of a total of four persons including the man of 40's and the added three test subjects are as follows. Three test subjects feel a smooth and dry sense in a case where the surface roughness Ra is 0.4 µm and feel a rough sense in a case where the surface roughness Ra is 0.8 µm or more. The remaining one test subject feels a smooth and dry sense in a case where the surface roughness Ra is 0.4 µm, feels both a smooth and dry sense and a rough sense in a case where the surface roughness Ra is 0.8 µm, and feels a rough sense in a case where the surface roughness Ra is 1.6 µm or more. From such results, test subjects feel a rough sense in a case where the surface roughness Ra exceeds 0.8 µm. As described above, in a case where the surface roughness Ra is 0.8 µm or more, in addition to the feeling of the tracing finger being rough, a frictional force is felt to be large, and accordingly, an effect of decreasing the detection threshold voltage cannot be expected. Furthermore, the impression of the tactile sense is not good. Thus, it is preferable that the surface roughness Ra is set to be less than 0.8 µm.

Based on the results of the evaluations for the four test subjects, in order to effectively decrease the detection threshold voltage while a state in which a texture sense can be easily perceived is maintained, it is understood that the desirable surface roughness Ra is in a range more than 0.01 µm and less than 0.8 µm and, more preferably, in a range more than 0.03 µm and less than 0.8 µm.

[Second Embodiment]

While the panel of the tactile sense presentation device described above in the first embodiment is configured: by the support substrate; the plurality of electrodes formed on the support substrate and extending in a predetermined direction, and the insulating layer covering the plurality of electrodes, the electrode does not need to be formed as the plurality of electrodes. Thus, in this embodiment, a tactile sense presentation device having one electrode is produced as a trial product.

Figure 13:
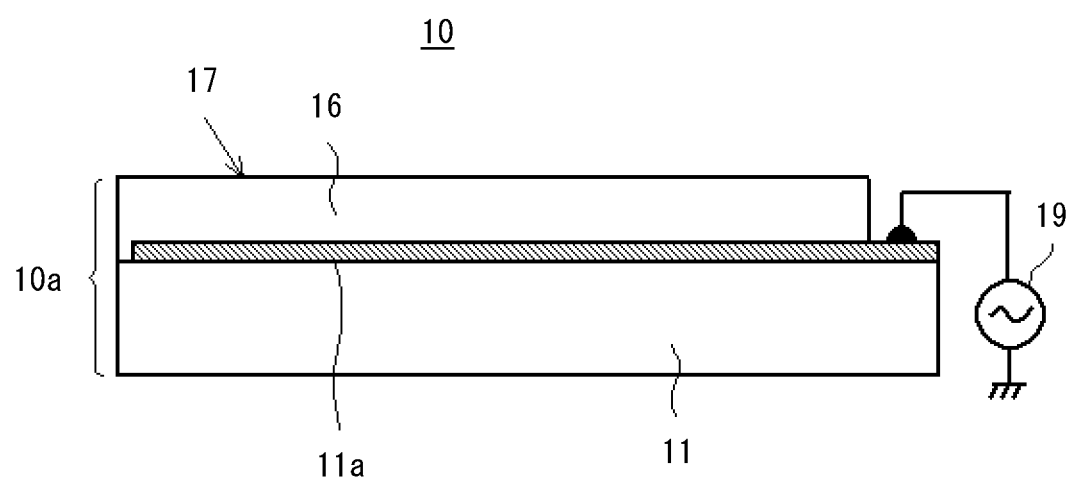
FIG. 13 is a planar view that illustrates an example of a tactile sense presentation device according to a second embodiment of the present invention.

First, the inventors of the present application produced a panel 10a of a tactile sense presentation device 10 as illustrated in FIG. 13 as a trial product. The panel 10a of this tactile sense presentation device 10 is configured by a support substrate 11 and one electrode 11a formed on the support substrate 11 and a drive unit 19 that outputs a voltage signal to the electrode 11a and an insulating layer 16 covering the electrode 11a, and the surface of this insulating layer 16 serves as a contact face 17.

Figure 14:
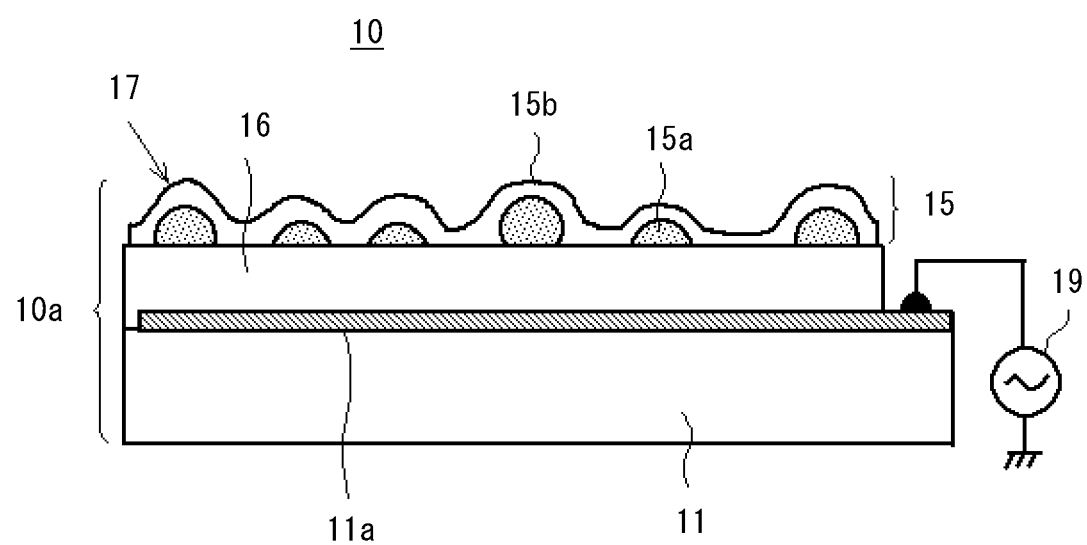
FIG. 14 is a planar view that illustrates another example of the tactile sense presentation device according to the second embodiment of the present invention.

In addition, the inventors of the present application produced a panel 10a of a tactile sense presentation device 10 as illustrated in FIG. 14. The panel 10a of this tactile sense presentation device 10 is configured by a support substrate 11 and one electrode 11a formed on the support substrate 11 and a drive unit 19 that outputs a voltage signal to the electrode 11a and an insulating layer 16 covering the electrode 11a and an antiglare layer 15 having a reflection prevention function for visible light in a further upper layer of the insulating layer 16, and the surface of this antiglare layer 15 serves as a contact face 17. Furthermore, a plurality of tactile sense presentation devices 10 having mutually-different properties and states (surface roughness) of the antiglare layer 15 were produced as trial products.

These panels 10a are evaluated as below. In a case where the voltage amplitude of the voltage signal output by the drive unit 19 is sufficiently high, when the finger traces the contact face 17 (the finger slides on the contact face), a rough texture sense is felt. From this state, the voltage amplitude of the voltage signal applied to the electrode 11a is gradually decreased, and a lowest voltage for which a difference of the tactile sense from the tactile sense at the time of the amplitude of the voltage signal applied to the electrode 11a being 0 V is considered to be identifiable is recorded. This voltage is a detection threshold voltage, and the detection threshold voltage was measured for each of the plurality of tactile sense presentation devices 10 produced as trial products.

The results are similar to that described with reference to FIG. 7. In other words, by applying an antiglare process for the contact face (the contact face of the insulating layer is formed to be rough), a presented tactile can be acquired very easily. In other words, the presented tactile stimulation can be perceived by the operator very easily. In addition, as the surface roughness of the contact face is suitably increased through the antiglare process, the operator can easily perceive a tactile stimulus. In other words, a special correlation is seen between the surface roughness of the contact face and a detection threshold voltage that is a lowest voltage for which the operator can perceive a texture sense for the surface roughness. More specifically, it is understood that, by setting the surface roughness Ra to be higher than 0.01 µm, an effect of decreasing the detection threshold voltage can be acquired. In addition, it is understood that the minimum value of the detection threshold voltage is near a surface roughness Ra of 0.05 µm. Furthermore, it has been disclosed that the detection threshold voltage corresponding to a range in which the surface roughness Ra is higher than 0.01 and less than 0.2392 µm is lower than the detection threshold voltage of a case where the surface roughness Ra is 0.00 µm.

As above, the reasons for the operator being able to easily perceive a tactile stimulus by appropriately increasing the surface roughness are as described in the following (1) to (3). The reasons for the operator being able to easily perceive a tactile stimulus in the first embodiment are as follows.

(1) Case where Surface Roughness is Low and Flat:

The contact face and the surface of the operator's finger are tightly brought into contact with each other, and intermolecular forces are strongly applied between the contact face and the surface. At this time, in a case where appropriate moisture is present, a hydrogen bond is generated, and accordingly, the intermolecular forces become strong. Considering a normal reaction that is a factor of a frictional force applied between the surface and the contact face when the operator moves his finger, there is an electrostatic force as one element of the normal reaction, and there is an intermolecular force as the other element. Since the intermolecular force is high, the ratio of the electrostatic force is small, and the rate of change in the normal reaction is low even in a case where the electrostatic force is controlled to be changed. For this reason, the rate of change in the friction is small, and it is difficult for the operator to perceive a tactile stimulus.

(2) Case where Surface Roughness is Higher than (1) and is Appropriate:

A gap is partly generated between the surface and the contact face, and the intermolecular force applied between the contact face and the surface rapidly decreases due to the gap. While there is an electrostatic force as one element of the frictional force, and there is an intermolecular force as the other element, as the ratio of the electrostatic force increases, the strength of the electrostatic force can be easily appear in the change of the friction.

(3) Case where Surface Roughness is Further Higher than (2):

When the operator moves his finger, the surface thereof is deformed to follow the irregularities of the contact face, and a frictional force accompanied with the deformation increases. Since the frictional force is high, the rate of change in the frictional force changing according to a change in the electrostatic force is low. For this reason, it is difficult for the operator to feel a texture sense.

Hereinafter, an example of a specific structure, a drive method, and a use form of the tactile sense presentation device 10 (particularly, the tactile sense presentation device 10 according to the first embodiment) having the above-described configuration will be described.

EXAMPLE 1

First, a first example of the present invention will be described with reference to FIGS. 15 to 18. In this example, a specific example of the frequency of the voltage signal applied to the X electrodes and the Y electrodes of the tactile sense presentation device 10 will be described.

Figure 15:
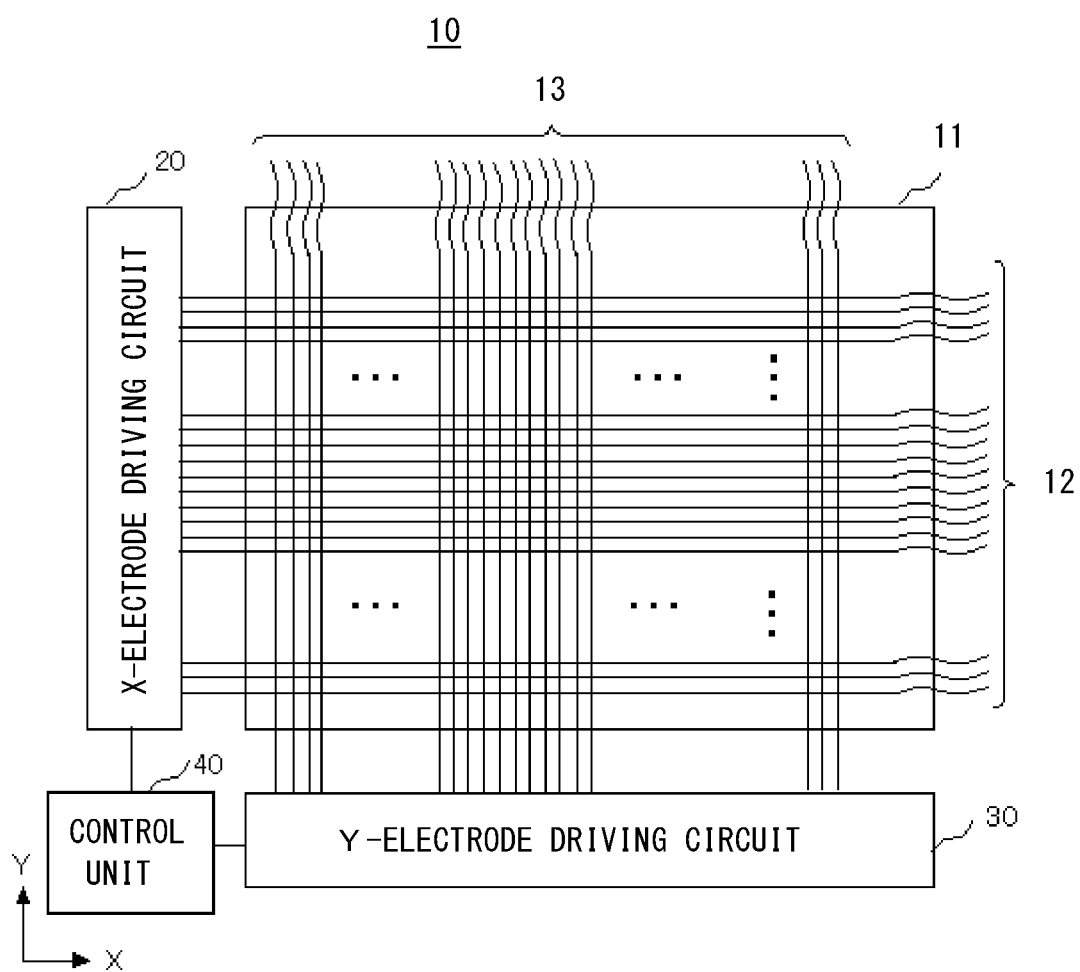
FIG. 15 is an explanatory diagram that illustrates the configuration of a tactile sense presentation device according to a first example of the present invention.

FIG. 15 is an explanatory diagram that illustrates the configuration of the tactile sense presentation device 10 according to the first example of the present invention. In a panel part of the tactile sense presentation device 10, on a support substrate 11 having a flat shape, a plurality of X electrodes 12 extending in the X-axis direction and a plurality of Y electrodes 13 extending in the Y direction are formed.

The X electrodes 12 and the Y electrodes 13 intersect each other at the intersections thereof through an insulating layer (not illustrated in the drawing), and an electrical insulating property therebetween is maintained by the insulating layer. In addition, on the X electrodes 12 and the Y electrodes 13, an insulating layer and/or an antiglare layer (not illustrated in the drawings) are formed, and the electrical insulating property between the X electrodes 12 and the finger and the Y electrodes 13 and the finger at the time of touching the contact face of the tactile sense presentation device 10 using the finger is maintained by the insulating layer and/or the antiglare layer.

Each of the X electrodes 12 is connected to an X-electrode driving circuit (drive unit) 20, and each of the Y electrodes 13 is connected to a Y-electrode driving circuit (drive unit) 30, and the X-electrode driving circuit 20 and the Y-electrode driving circuit 30 are connected to a control unit 40. The control unit 40 specifies an electrode corresponding to an area in which a tactile sense is presented to the operator based on information input from the outside (for example, a processor controlling the operation of an electronic apparatus in which the tactile sense presentation device 10 is mounted), outputs a control signal used for driving the specified electrode to the X-electrode driving circuit 20 and the Y-electrode driving circuit 30, and the X-electrode driving circuit 20 and the Y-electrode driving circuit 30 apply a voltage signal having a voltage amplitude corresponding to the surface roughness of the insulating layer or the antiglare layer to the X electrodes 12 and the Y electrodes 13 based on the control signal. By employing such a configuration, the tactile sense presentation device 10 can present a texture sense to a desired area. In the claims, the control unit 40 outputting a control signal and the electrode driving circuits applying a voltage to the electrodes based on the control signal are collectively referred to as a drive unit.

Figure 16:
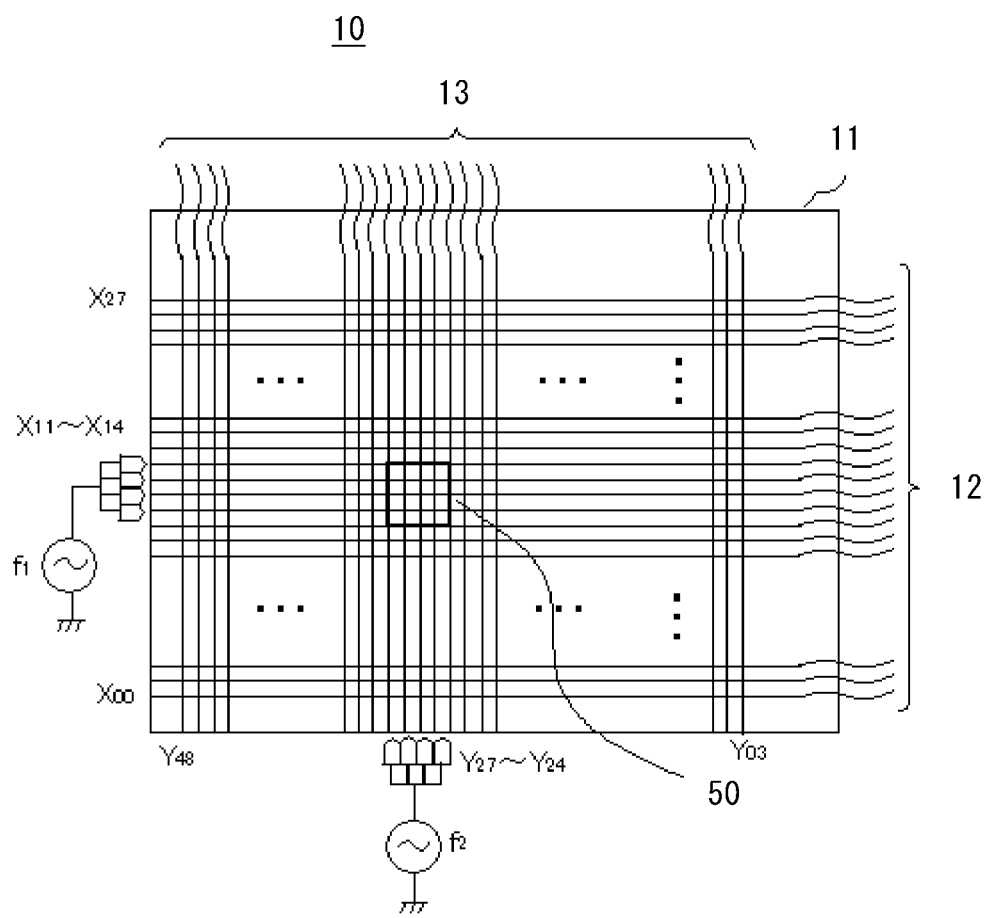
FIG. 16 is a diagram that illustrates a method of driving the tactile sense presentation device illustrated in FIG. 15.

FIG. 16 is an explanatory diagram that illustrates a method of driving the tactile sense presentation device 10 illustrated in FIG. 15. Here, the X electrodes 12 and the Y electrodes 13 will be discriminated form each other using different symbols. In the example illustrated in FIG. 16, while 28 X electrodes 12 and 46 Y electrodes 13 are formed on the support substrates 11, the X electrodes 12 will be respectively referred to as X00 to X27 from the bottom in the upward direction, and the Y electrodes 13 will be referred to as Y03 to Y48 from the right side toward the left side. Here, an area in which a texture sense is to be presented is assumed to be a target area 50. The target area 50 is in the range of X11 to X14 in the X direction and is in the range of Y24 to Y27 in the Y direction. The control unit 40 applies control signals to the X-electrode driving circuit 20 and the Y-electrode driving circuit 30 based on information of the target area 50 supplied from the outside.

As the control signals are received, the X-electrode driving circuit 20 applies an AC voltage signal having a first frequency (here, the frequency $f_1$=1000 Hz) to X11 to X14, and the Y-electrode driving circuit 30 applies an AC voltage signal having a second frequency (the frequency $f_2$=1240 Hz) to Y24 to Y27. In addition, in the case illustrated in FIG. 16, in order to prevent the application of a voltage according to capacitance coupling between the electrodes, the X-electrode driving circuit 20 and the Y-electrode driving circuit 30 apply the ground or a DC voltage to the X electrodes 12 and the Y electrodes 13 other than the electrodes described above.

In the configuration described above, in an area acquired by excluding the target area 50 from the area disposed above the X electrodes 12 of X11 to X14, a texture sense corresponding to the voltage signal applied to the electrode is not presented (only a texture sense of the material state is presented). In addition, in an area acquired by excluding the target area 50 from the area disposed above the Y electrodes 13 of Y24 to Y27, a texture sense corresponding to the voltage signal applied to the electrode is not presented (only a texture sense of the material state is presented). From this, it has been checked that a human's finger has a characteristic of not perceiving a texture sense according to a voltage signal in a case where the frequency of the voltage signal applied to the electrode is 1000 Hz or 1240 Hz.

Meanwhile, in the target area 50, since the X electrode 12 to which a voltage signal having $f_1$=1000 Hz is applied and the Y electrode 13 to which a voltage signal having $f_2$=1240 Hz is applied are adjacent to teach other, a beat known in the field of a wave motion is generated, and the texture sense is presented using the beat. Thus, in this example, a texture sense corresponding to a voltage signal is not presented at the frequency of the voltage signal applied to each electrode, but the frequency of the voltage signal applied to each electrode is set such that a texture sense according to a voltage signal is presented using a frequency defined in the beat, and the target area 50 can be determined based on the tactile sense.

Figure 17:
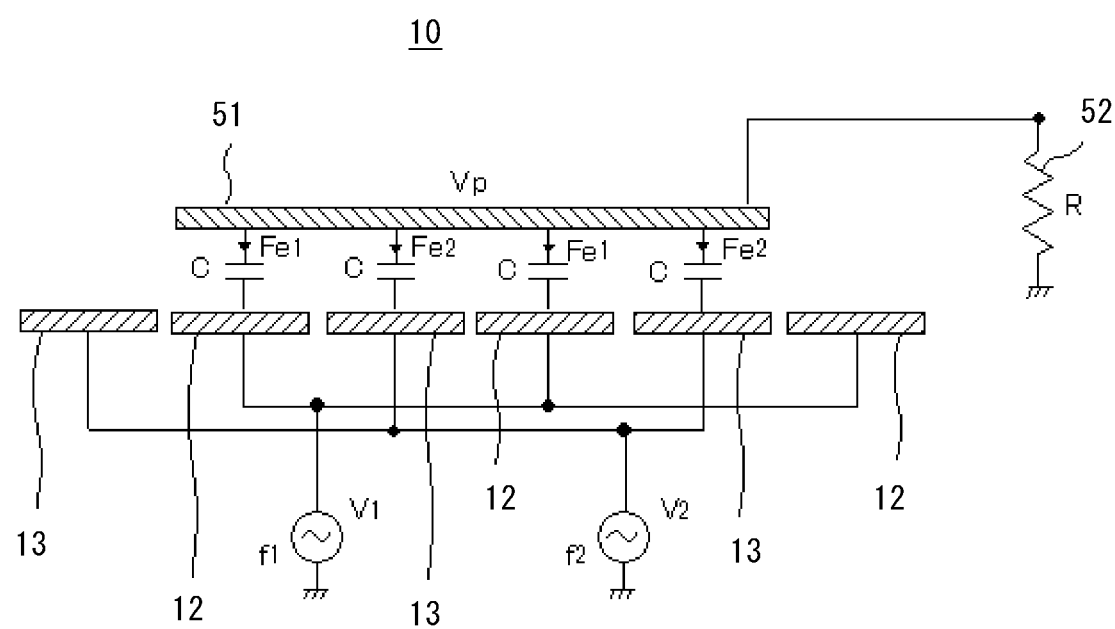
FIG. 17 is a schematic diagram that illustrates a sectional model of the tactile sense presentation device illustrated in FIGS. 15 and 16.

FIG. 17 is a schematic diagram that illustrates a sectional model of the tactile sense presentation device 10 illustrated in FIGS. 15 and 16. As described above, the plurality of X electrodes 12 and the plurality of Y electrodes 13 are arranged on the support substrate 11 having a planar shape to be neighboring to each other. Among the X electrodes 12 and the Y electrodes 13, at a position facing two X electrodes 12 and two Y electrodes 13 arranged inside the target area 50, one electrode 51 modeling a finger is arranged.

Since the human body has a grounding effect to some degree, this electrode 51 can be modeled as being grounded through a resistor 52 having a resistance value R.

Here, a voltage signal $V_1$ represented as $V_1 = A \cos(2\pi f_1 t)$ is applied to the X electrodes 12 disposed inside the target area 50. The amplitude of the voltage signal $V_1$ is A, the frequency is $f_1$, and t represents the time. In addition, a voltage signal $V_2$ represented as $V_2 = A \cos(2\pi f_2 t)$ is applied to the Y electrodes 13 disposed inside the target area 50. The amplitude of the voltage signal $V_2$ is A that is the same as the amplitude of the voltage signal $V_1$, and the frequency is $f_2$.

Between the electrode 51 and each of the X electrodes 12 disposed inside the target area 50 can be modeled as a parallel flat plate capacitor having electrostatic capacitance C.

In addition, between the electrode 51 and each of the Y electrodes 13 disposed inside the target area 50 can be modeled as a parallel flat plate capacitor having electrostatic capacitance C.

At this time, when the resistance value R is sufficiently high, a voltage $V_P$ appearing at the electrode 51 can be represented using Equation 1.

$$V_p = \frac{V_2 + V_1}{2} \quad (1)$$

When an electrostatic force applied between one X electrode 12 and the electrode 51 acquired by modeling a finger is $F_{e1}$, the electrostatic force $F_{e1}$ can be represented as Equation 2 by using a known formula as a force applied between the electrodes of the parallel flat plate capacitor.

Here, ε is a dielectric constant, and S is the area of the electrode of the parallel flat plate capacitor.

$$F_{e1} = \frac{1}{2\varepsilon S}\left(C\frac{V_2 - V_1}{2}\right)^2 \quad (2)$$

Similarly, when an electrostatic force applied between one Y electrode 13 and the electrode 51 acquired by modeling a finger is $F_{e2}$, the electrostatic force $F_{e2}$ can be represented as Equation 3.

$$F_{e2} = \frac{1}{2\varepsilon S}\left(C\frac{V_1 - V_2}{2}\right)^2 \quad (3)$$

In a case where the gap between the electrodes is so fine that the electrostatic force $F_{e1}$ and the electrostatic force $F_{e2}$ cannot be discriminated by a person's the fingertip, it can be regarded that a force acquired by summing the electrostatic forces $F_{e1}$ and $F_{e2}$ is macroscopically applied to the finger.

A sum F of all the forces applied to the electrode 51 acquired by modeling a finger is $F=2(F_e1+F_{e2})$ by referring to FIG. 17, and accordingly, by using $V_1$, $V_2$, and Equations 2 and 3 described above, can be represented using Equation 4.

$$F = \frac{A^2 C^2}{2\varepsilon S}\{1 - \cos 2\pi(f_1 + f_2)t\}\{1 - \cos 2\pi(f_1 - f_2)t\} \quad (4)$$

Based on Equation 4, it can be understood that the sum F of all the forces applied to the modeled electrode 51 is acquired by multiplying a periodic function having a range of [0, $A^2C^2/(\varepsilon S)$] and a frequency of the absolute value of $(f_1+f_2)$ by a periodic function having a range of [0, 2] and a frequency of the absolute value of $(f_1-f_2)$. The frequency of the envelope thereof is the absolute value of $(f_1-f_2)$.

In this example, since the frequency $f_1=1000$ Hz, and the frequency $f_2=1240$ Hz, the absolute value of a difference thereof is 240 Hz. For this reason, the frequency of the attractive force applied to the finger, as represented in Equation (4), changes to 240 Hz. Thus, in a case where a person traces the contact face 17 of the tactile sense presentation device 10 using his finger, a change in the frictional force occurs at the frequency of 240 Hz. Since 240 Hz is a frequency for which a person's cutaneous mechanoreceptor has sensitivity, a texture sense can be perceived.

In addition, a voltage signal having a frequency $f_1$ is applied to all the X electrodes 12 disposed on the support substrate 11, and a voltage signal having a frequency $f_2$ is applied to all the Y electrodes 13, and the presence/absence of the perception of a texture sense for the absolute value of a difference between the frequencies $f_1$ and $f_2$ has been checked through a test. As a result, it has been checked that a texture sense is perceived in a case where the absolute value of the difference between the frequencies $f_1$ and $f_2$ is higher than 10 Hz and lower than 1000 Hz, and a texture sense is not perceived in a case where the absolute value of the difference between the frequencies $f_1$ and $f_2$ is lower than 10 Hz or higher than 1000 Hz.

In addition, the same voltage signal is applied to the X electrodes 12 and the Y electrodes 13, and the presence/absence of the perception of a texture sense has been checked through a test while changing the frequency of the voltage signal. As a result, it has been checked that a texture sense is perceived in a case where the frequency of the voltage signal is in a range higher than 5 Hz and lower than 500 Hz, and a texture sense is not perceived in a case where the frequency of the voltage signal is out of the range.

Based on such results, in a case where the frequency of the voltage signal applied to the X electrodes 12 is set to $f_1$, and the frequency of the voltage signal applied to the Y electrodes 13 is set to $f_2$, by setting the frequencies $f_1$ and $f_2$ such that both the frequencies $f_1$ and $f_2$ are 500 Hz or higher, and the absolute value of a difference between the frequencies $f_1$ and $f_2$ is higher than 10 Ha and lower than 1000 Hz, a tactile sense presentation device 10 can be realized which presents a texture sense corresponding to the voltage signal to an area in which the X electrode 12 to which the voltage signal of the frequency $f_1$ is applied and the Y electrode 13 to which the voltage signal of the frequency $f_2$ is applied interest each other but does not present a texture sense corresponding to the voltage signal to the other area (only the texture sense of the material state of the contact face 17 is presented).

Here, the frequencies of the voltage signals applied to the X electrodes 12 and the Y electrodes 13 are not limited to those described above but may be appropriately change according to the surface roughness of the contact face 17, the detection threshold voltage, and the like. In addition, in the description presented above, while the AC voltage signals having a sinusoidal shape are applied to the X electrodes 12 and the Y electrodes 13, voltage signals having a pulse shape in which On and Off are intermittently repeated may be applied.

EXAMPLE 2

Next, a second example of the present invention will be described with reference to FIGS. 18 to 20. In this example, specific shapes of the X electrodes and the Y electrodes of the tactile sense presentation device 10 and a method of manufacturing the tactile sense presentation device 10 will be described.

Figure 18:
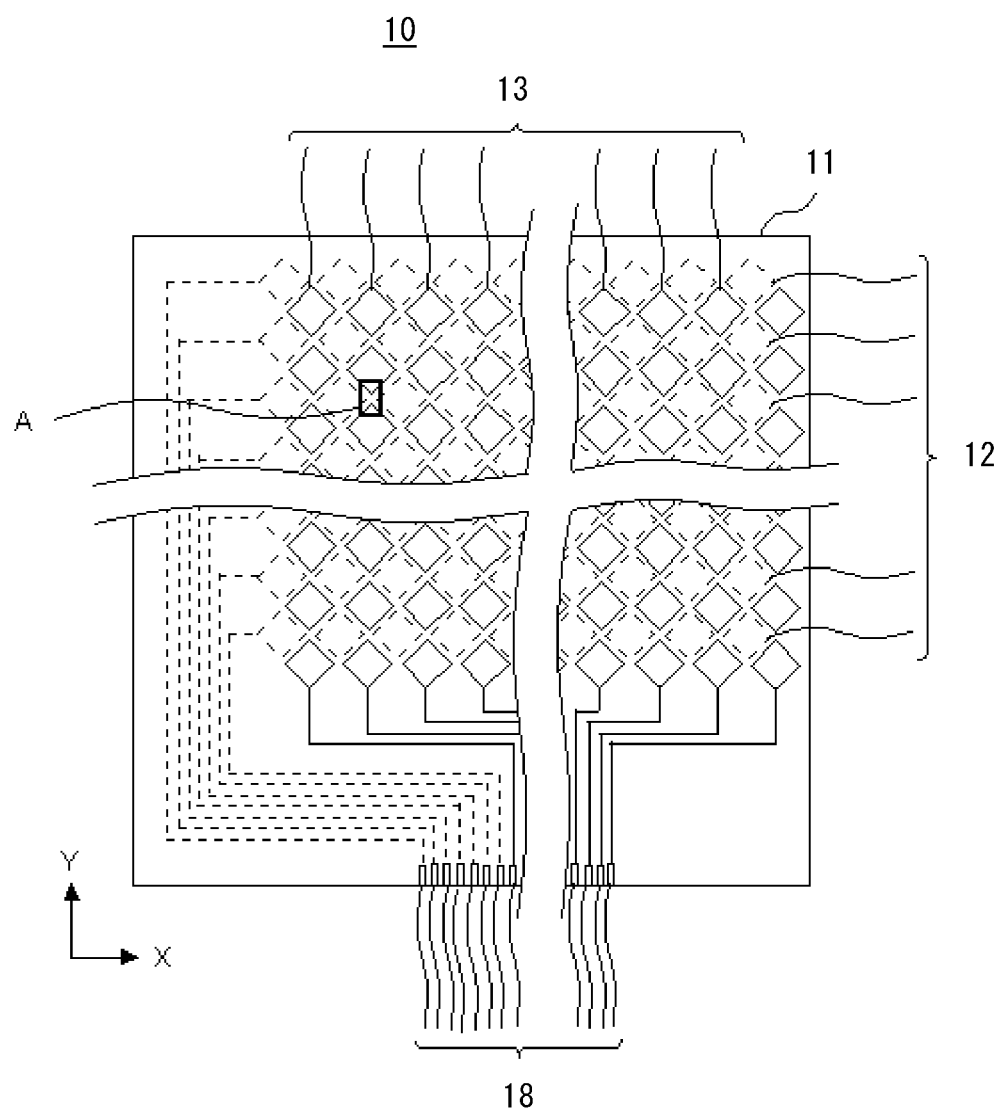
FIG. 18 is a planar view that illustrates a specific shape of electrodes of a tactile sense presentation device according to a second example of the present invention.

FIG. 18 is a planar view that illustrates specific shapes of the support substrate 11, the X electrodes 12 and the Y electrodes 13 of the tactile sense presentation device 10 illustrated in FIG. 15. In FIG. 18, the X electrodes 12 and wirings thereof are illustrated using broken lines, and the Y electrodes 13 and wirings thereof are illustrated using solid lines.

The X electrodes 12 have a shape in which a plurality of electrodes having a rhombus shape are connected through connection portions in a rosary shape. In other words, one X electrode 12 has a shape in which rhombus-shaped electrodes neighboring to the left and right sides are electrically connected through connection portions. These X electrodes 12 are arranged at an interval of 2 mm in the Y-axis direction. In other words the pitch of the X electrodes 12 is 2 mm. Similarly, the Y electrodes 13 have a shape in which a plurality of electrodes having a rhombus shape are connected through connection portions in a rosary shape. In other words, one Y electrode 13 has a shape in which rhombus-shaped electrodes neighboring to the upper and lower sides are electrically connected through connection portions. These Y electrodes 13 are arranged at an interval of 2 mm in the X-axis direction. In other words the pitch of the Y electrodes is 2 mm.

The X electrodes 12 and the Y electrodes 13 are formed such that the connection portions of the rhombus-shaped electrodes overlap each other through the insulating film in the plan view. In addition, a major portion of the rhombus-shaped portion of the X electrode 12 and a major portion of the rhombus-shaped portion of the Y electrode 13 are formed not to overlap each other. In other words, a shape is formed such that the major portion of the rhombus-shaped portion of the X electrode 12 and the major portion of the rhombus-shaped portion of the Y electrode 13 are neighboring to each other in the plan view.

Figure 19:
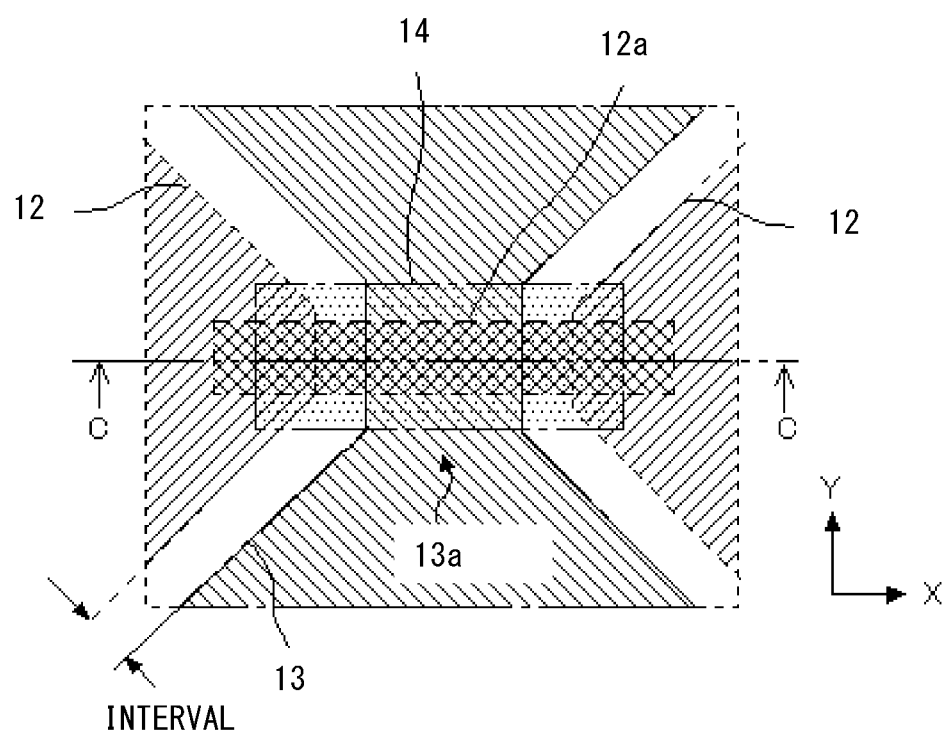
FIG. 19 is a planar view acquired by enlarging the structure of a connection portion of an X electrode and a Y electrode that is denoted by A in FIG. 18.
Figure 20:
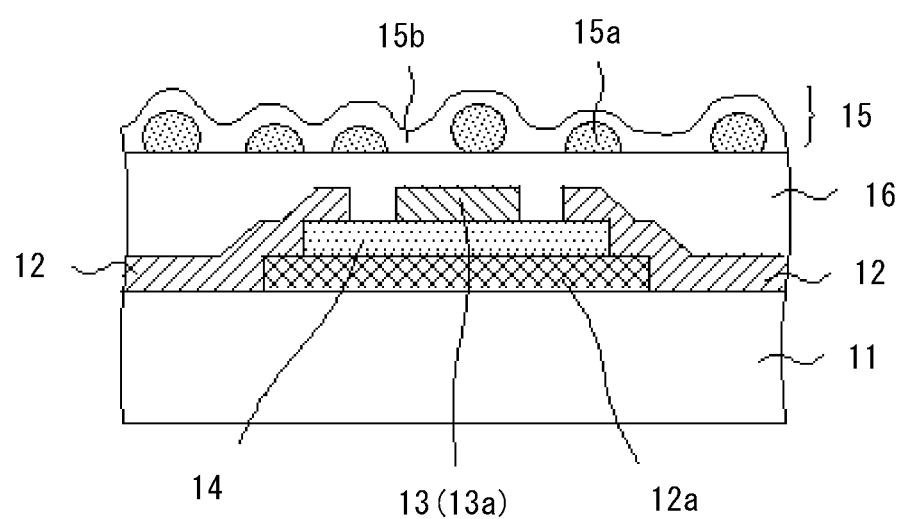
FIG. 20 is a cross-sectional view that illustrates the structure of the connection portion of the X electrode and the Y electrode denoted by A in FIG. 18 and illustrates a cross-section taken along line C-C illustrated in FIG. 19.

FIGS. 19 and 20 are diagrams acquired by enlarging the structure of the connection portion of the X electrodes 12 and the Y electrodes 13 illustrated in FIG. 18, FIG. 19 is a planar view that illustrates a mutual connection portion of electrodes represented as a block A illustrated in FIG. 18, and FIG. 20 is a cross-sectional view taken along line C-C illustrated in FIG. 19.

The X electrodes 12 are configured such that rhombus-shaped electrodes are connected to each other through a bridge electrode 12a. In addition, the Y electrodes 13 are configured such that rhombus-shaped electrodes are connected to each other through a connection portion 13a using the same material as that of the Y electrodes 13. The bridge electrode 12a and the connection portion 13a of the Y electrode 13 are insulated by the insulating layer 14.

The cross-sectional structure of the connection portions of the X electrodes 12 and the Y electrodes 13 and the manufacturing sequence will be described with reference to FIG. 20. First, on a support substrate 11 formed using a transparent insulating material such as glass, a bridge electrode 12a is formed using a transparent conductive material such as ITO.

Next, an insulating layer 14 is formed using an organic material on the bridge electrode 12a. By forming the insulating layer 14 using the organic material, the film thickness of the insulating layer 14 can be formed to be large, and thus, coupling capacitance, which is originally unnecessary, formed at the intersection between the X electrode 12 and the Y electrode 13 can be decreased. In order to insulate the connection portion 13a of the Y electrode 13 and the bridge electrode 12a from each other, this insulating layer 14 is formed in a shape covering the bridge electrode 12a in the Y-axis direction (the depth direction in the diagram) but not covering the end portion of the bridge electrode 12a in the X-axis direction (the horizontal direction in the diagram) such that the bridge electrode 12a and the rhombus-shaped portion of the X electrode 12 are in contact with each other. Next, the X electrodes 12, the Y electrodes 13, the connection portions 13a, the other wirings, and the terminal 18 are formed together using a transparent conductive material such as ITO.

Next, an insulating layer 16 is formed as a film using an organic material, and, thereon, spray coating of a coating layer material 15b in a solution that includes particles 15a formed using silica having a predetermined size or the like is performed, the coated coating layer material is dried, and an antiglare layer 15 is formed. At that time, by changing the content ratio of the particles 15a to the coating layer material 15b, a spraying method, the material, the size, and the shape of the particles 15a, the material, the viscosity, and the like of the coating layer material 15b, the antiglare layer 15 is formed such that surface roughness Ra of the antiglare layer 15 is in a range higher than 0.01 µm (more preferably, 0.05 µm)) and lower than 0.8 µm. Thereafter, a contact hole is formed in the terminal 18 portion.

A plurality of terminals 18 formed on the support substrate 11 are connected to the X electrodes 12 or the Y electrodes 13 through wirings. Then, one end of a flexible printed circuit (FPC) is attached to the terminal 18 through an anisotropic conductive film (ACF), and the other end of the FPC is connected to a printed board in which the X-electrode driving circuit 20 and the Y-electrode driving circuit 30 are mounted.

Through the process described above, the tactile sense presentation devices 10 having the structures illustrated in FIGS. 18 to 20 can be manufactured. The shapes of the X electrodes 12 and the Y electrodes 13 of the tactile sense presentation device 10 described above and the above-described method of manufacturing the tactile sense presentation device 10 are only examples and can be appropriately changed.

EXAMPLE 3

Next, a third example of the present invention will be described with reference to FIGS. 21 and 22. In this example, a specific configuration of electrode driving circuits of the tactile sense presentation device 10 and an operation method thereof will be described.

Figure 21:
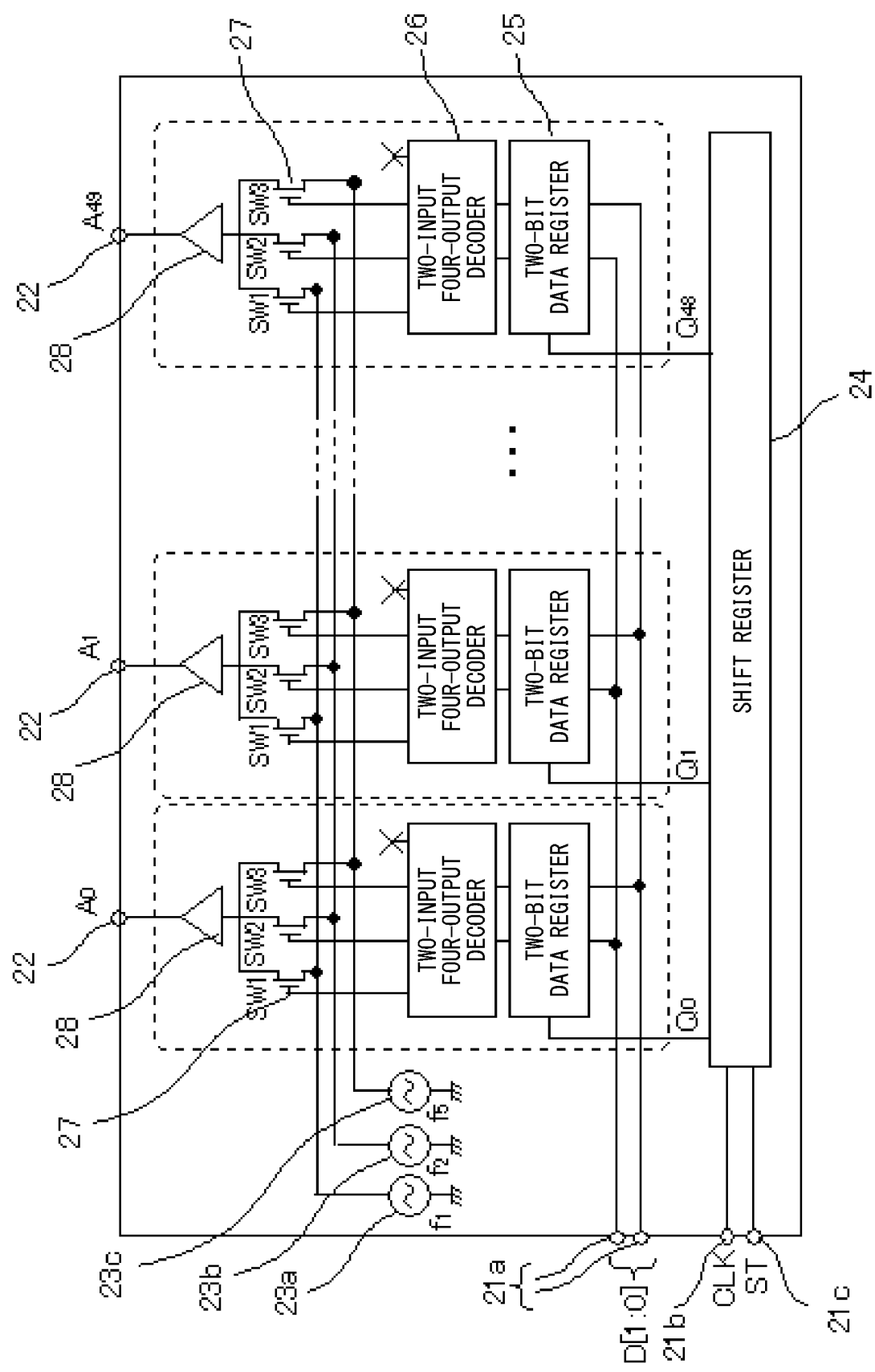
FIG. 21 is an explanatory diagram that illustrates the detailed configuration of an X-electrode driving circuit of a tactile sense presentation device according to a third example of the present invention.

FIG. 21 is an explanatory diagram that illustrates the detailed configuration of the X-electrode driving circuit 20 of the tactile sense presentation device 10 illustrated in FIG. 15. The Y-electrode driving circuit 30 and the X-electrode driving circuit 20 have the same configuration, and thus, here, only the configuration of the X-electrode driving circuit 20 will be described.

The X-electrode driving circuit 20 includes a data input terminal 21a and a clock input terminal 21b and a start pulse input terminal 21c as input terminals. Such input terminals are connected to the control unit 40 and receive control signals generated by the control unit 40.

In addition, the X-electrode driving circuit 20 includes a plurality of output terminals 22 outputting voltage signals to be applied to the X electrodes 12 as output terminals. In the example illustrated in FIG. 21, the number of the output terminals 22 is 50 and are respectively represented as A0 to A49.

In addition, the X-electrode driving circuit 20, in addition to such input/output terminals, includes: an AC voltage generating unit 23a that generates an AC voltage having a frequency $f_1$ an AC voltage generating unit 23b that generates an AC voltage having a frequency $f_2$ and an AC voltage generating unit 23c that generates an AC voltage having a frequency $f_5$. The frequencies $f_1$, $f_2$, and $f_5$ are respectively, 1000 Hz, 1240 Hz, and 3000 Hz.

Furthermore, the X-electrode driving circuit 20 includes a shift register 24 of 50 bits. The shift register 24 includes 50 output terminals (Q0 to Q49), and such output terminals are respectively connected to data registers 25 each having two bits. Each two-bit data register 25 is connected to the data input terminal 21a and a bus.

An output signal output from each two-bit data register 25 is connected to a two-input four-output decoder 26. The two-input four-output decoder 26 receives an input signal of two bits as input and outputs a voltage signal of a high level to one of four output terminals in accordance with this input signal. The input two-bit signal and the output terminal to which the voltage signal of the high level is output have one-to-one correspondence.

One of the output terminals of the two-input four-output decoder 26 is not used in this example, and the gate electrodes of switch transistors 27 are connected to the remaining three output terminals. The switch transistors 27 that are respectively connected to these three output terminals will be referred to as SW1 to SW3.

An output terminal of the switch transistor 27 is connected to the input of the amplifier 28. The input terminals SW1 to SW3 of the switch transistor 27 are respectively connected to output terminals of the AC voltage generating units 23a to 23c. In other words, AC voltages having frequencies $f_1$, $f_2$, and $f_5$ are respectively input to the input terminals SW1 to SW3. The two-input four-output decoder 26 has a function for selectively switching AC voltages to be output to the amplifiers 28 among voltages of the frequencies in accordance with an output from the two-bit data register 25.

Then, AC voltages amplified by the amplifiers 28 are output from the output terminals 22 to the X electrodes 12. In other words, the X-electrode driving circuit 20 achieves the function of a circuit selecting one AC voltage signal among the signals of frequencies $f_1$, $f_2$, and $f_5$ in accordance with a signal input from the control unit 40 through the data input terminal 21a and outputting the selected signal to the X electrode 12 through the output terminal 22.

Figure 22:
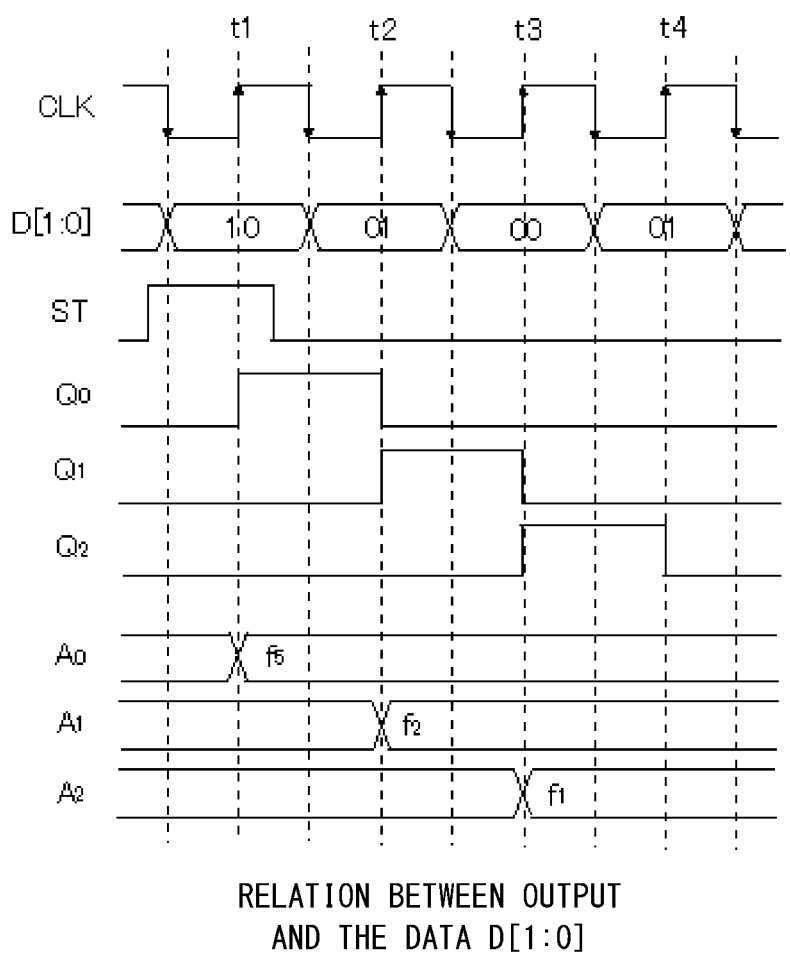
FIG. 22 is a timing diagram that illustrates the operation of the X-electrode driving circuit illustrated in FIG. 21.

FIG. 22 is a timing diagram that illustrates the operation of the X-electrode driving circuit 20 illustrated in FIG. 21. "CLK" represented in the drawing is a clock waveform voltage input from the control unit 40 through the clock input terminal 21b. "D[1:0]" is a two-bit data signal input from the control unit 40 through the data input terminal 21a. "ST" is a start pulse waveform voltage that is input from the control unit 40 through the start pulse input terminal 21c.

Here, D[1:0] input from the control unit 40 through the data input terminal 21a is a binary representation and thus, may have four kinds of values including "00", "01", "10", and "11". The shift register 24 latches the value of ST for each rising edge of CLK and outputs the latched value to the output terminal Q0 of the shift register. Then, the value of Q0 is delayed by one period of CLK and is output to the output terminal Q1. In addition, the value of Q1 is delayed by one period of CLK and is output to the output terminal Q2. In this way, the shift register 24 outputs a pulse waveform voltage synchronized with the rising edge of CLK sequentially to the output terminals Q0 to Q49.

When the pulse waveform voltage is output to the output terminal of the shift register 24, a registered value of the two-bit data register 25 is updated with the value of data D[1:0] of that time in synchronization with the rising edge and is output to the output terminal of the two-bit data register 25.

The two-input four-output decoder 26 receives signals output to the terminals of the two-bit data register 25 and turns on one switch transistor 27 among the switch transistors SW1 to SW3, and one AC voltage signal among voltage signals of frequencies $f_1$, $f_2$, and $f_5$ is output to the output terminal 22 in accordance therewith.

The X-electrode driving circuit 20 associates the frequency $f_1$ with the data D[1:0]=00, associates the frequency $f_2$ with the data D[1:0]=01, and associates the frequency $f_5$ with the data D[1:0]=10. For this reason, at time t1 illustrated in FIG. 22, a voltage signal having the frequency $f_5$ is output to A0 of the output terminal 22, at time t2, a voltage signal having the frequency $f_2$ is output to A1 of the output terminal 22, and, at time t3, a voltage signal having the frequency $f_1$ is output to A2 of the output terminal 22. The amplitude of each voltage signal is 70 V. Here, D[1:0]=11 is not used.

The frequency of the voltage signal output to the output terminal 22 is not changed until a next pulse waveform voltage is input to the start pulse input terminal 21c, and the registered value of the two-bit data register 25 is updated.

In FIG. 22, the output waveforms of output terminals Q0 to Q2 among the 50 output terminals Q0 to Q49 of the shift register 24 are illustrated as an example, but the other output waveforms are not illustrated. Similarly, for the voltage signals of the 50 output terminals 22 A0 to A49 of the X-electrode driving circuit 20, A0 to A2 are illustrated as an example, but the other voltage signals are not illustrated. The configuration and the driving method of the electrode driving circuits described above are examples and can be appropriately changed.

EXAMPLE 4

Next, a fourth example of the present invention will be described with reference to FIGS. 23 and 24. In this example, an example of the use form of the tactile sense presentation devices 10 illustrated in the embodiments and the first to third examples described above will be described.

Figure 23:
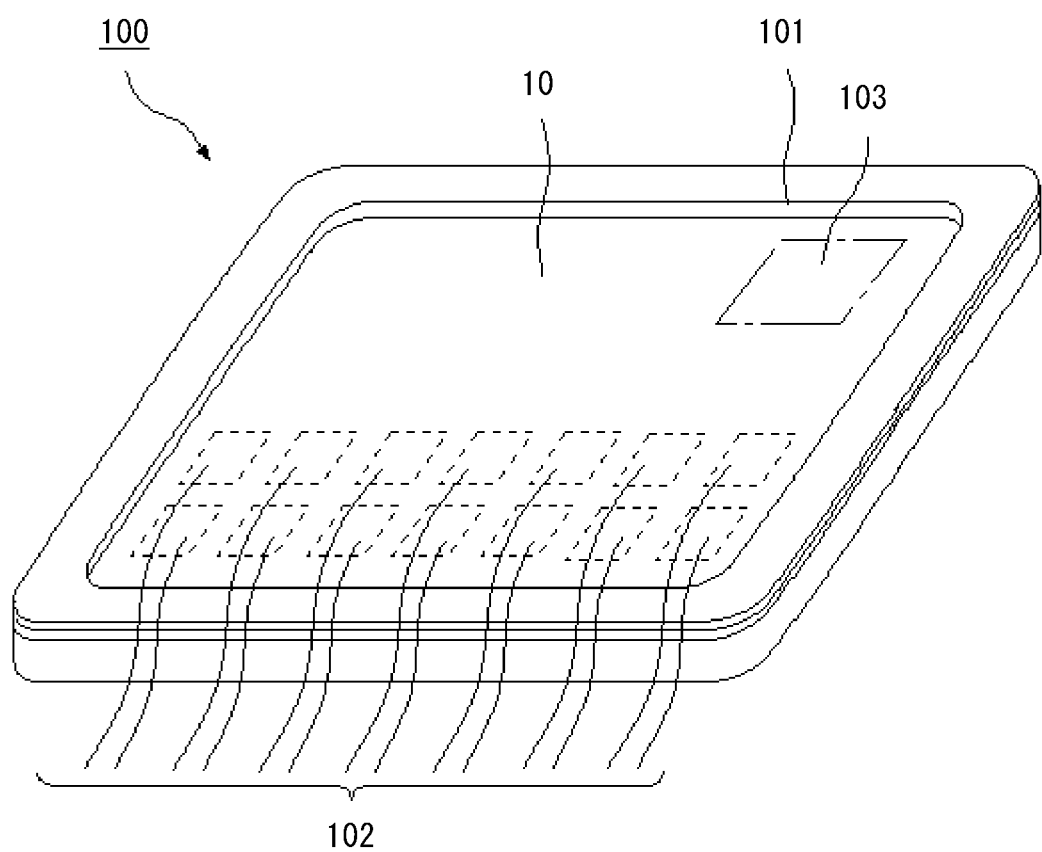
FIG. 23 is a perspective view that illustrates an example of an electronic apparatus including a tactile sense presentation device according to a fourth example of the present invention.
Figure 24:
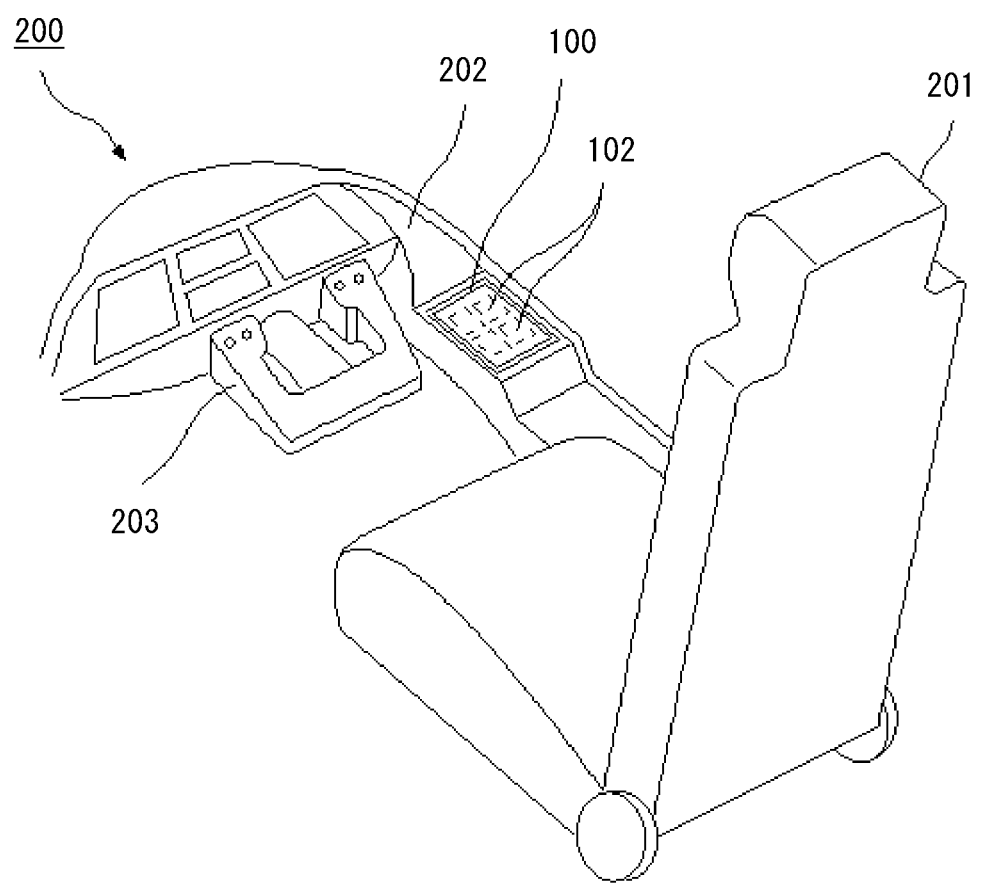
FIG. 24 is a perspective view that illustrates an example of a mobile unit including a tactile sense presentation device according to a fourth example of the present invention.

FIG. 23 is a perspective view that illustrates the configuration of an electronic apparatus 100 according to an application of the present invention. The electronic apparatus 100, for example, is a smartphone, a tablet terminal, an electronic book reader, a notebook personal computer, or the like.

The electronic apparatus 100 includes a display apparatus 101 of the touch panel type, and the tactile sense presentation device 10 described above is arranged on the front face or the rear face of the display apparatus 101 of the touch panel type. Here, in a case where a touch panel of an electrostatic capacitance type is employed as the display apparatus 101 of the touch panel type, the function thereof and the function of the tactile sense presentation device 10 are not achieved together, it is preferable to use an optical touch panel or the like.

In the electronic apparatus 100, a result of a process executed by a built-in processor 103 is displayed on the display apparatus 101 of the touch panel type, and a user performs operation input of the display apparatus 101 of the touch panel type in accordance with the display. In addition, it may be configured such that the processor is not built in the electronic apparatus 100, the display apparatus 101 of the touch panel type displays a result of the process executed by an external apparatus, and an operation input according thereto is returned to the external apparatus.

On the display apparatus 101 of the touch panel type, a plurality of operation keys 102 are displayed, and, in accordance therewith, the tactile sense presentation device 110 presents a plurality of isolated texture senses at positions corresponding to the operation keys 102. A user can detect the positions of the operation keys 102 based on the texture senses, and key input can be performed without seeing the operation key 102. In this way, for example, a visually-impaired user can use the electronic apparatus 100.

In addition, this electronic apparatus 100 can be used as a navigation apparatus mounted on a mobile unit such as a vehicle, a bicycle, a two-wheeled vehicle, an airplane, a train, or a ship. FIG. 24 is a perspective view that illustrates the configuration of a mobile unit 200 according to an application of the present invention. The mobile unit 200 includes a driver's seat 201 on which a user (driver) sits and a dashboard 202 having the electronic apparatus 100 illustrated in FIG. 23 as a navigation apparatus mounted therein and steering mechanisms 203 such as a handle, an accelerator, and a brake and the like.

This electronic apparatus 100, like the example illustrated in FIG. 23, presents a plurality of isolated texture senses at positions corresponding to the operation keys 102. The user can perform operation key input based on the texture senses. As route information presented as a result of the process, by presenting a texture sense to a route displayed on a map, the display of the route can be represented to be visually noticeable. Accordingly, the user can perform an operation of the navigation apparatus while attending to the front of the vehicle, and therefore, safe driving can be continued.

The present invention is not limited to the embodiments and the examples described above but the configuration, the manufacturing method, the driving method, the use method, and the like of the tactile sense presentation device 10 can be appropriately changed unless departing from the concept of the present invention.

For example, in the first embodiment and the examples, while the configuration including the X electrodes 12 extending in the X-axis direction and the Y electrodes 13 extending in the Y-axis direction has been described, a configuration including only electrodes extending in one direction may be employed.

The present invention can be used for a tactile sense presentation device presenting a tactile sense, an electronic apparatus including the tactile sense presentation device such as a touch panel and a terminal for a visually-impaired person, and a method of driving the tactile sense presentation device.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A tactile sense presentation device comprising:
a panel that includes a support substrate, an electrode formed on the support substrate, and an insulating layer covering the electrode; and
a drive unit that drives the panel,
wherein a tactile sense is presented to an operator by the drive unit applying a signal of a voltage with a predetermined frequency to the electrode, by an electrostatic force generated between the electrode and the operator changing according to the predetermined frequency, and by a frictional force between the operator and a contact face of the insulating layer that is in contact with the operator changing,
wherein an arithmetic average roughness of the contact face is a fixed value within a predetermined range which is larger than 0.01 μm and smaller than 0.8 μm,
wherein there is a correlation between the arithmetic average roughness and a detection threshold voltage for which the operator can perceive the tactile sense at the arithmetic average roughness, and
wherein the voltage applied to the electrode is equal to or higher than a voltage of the detection threshold voltage corresponding to the fixed value of the arithmetic average roughness of the contact face.

2. The tactile sense presentation device according to claim 1,
wherein the electrode is a plurality of electrodes formed on the support substrate and extending in a predetermined direction, and the insulating layer covers the plurality of electrodes;
wherein the voltage applied to the plurality of electrodes corresponding to an area in which the tactile sense is presented to the operator is a voltage corresponding to the arithmetic average roughness of the contact face.

3. The tactile sense presentation device according to claim 1, wherein the insulating layer has a structure in which particles of a size causing the contact face to have the arithmetic average roughness of the predetermined range are dispersed in an insulating material.

4. The tactile sense presentation device according to claim 1,
wherein the insulating layer is configured by a lower insulating layer covering the electrode and an upper insulating layer covering the lower insulating layer, and
wherein the upper insulating layer has a structure in which particles of a size causing the contact face to have the arithmetic average roughness of the predetermined range are dispersed in an insulating material.

5. The tactile sense presentation device according to claim 3, wherein the insulating layer is an antiglare layer having a reflection prevention function for visible light.

6. The tactile sense presentation device according to claim 4, wherein the upper insulating layer is an antiglare layer having a reflection prevention function for visible light.

7. The tactile sense presentation device according to claim 1, wherein the predetermined range is a range in which the arithmetic average roughness is larger than 0.03 μm and smaller than 0.8 μm.

8. The tactile sense presentation device according to claim 1, wherein the predetermined range of the arithmetic average roughness is rougher than a state in which a finger of the operator is stuck to the contact face as a contact area between the contact face and the finger of the operator becomes relatively large and is finer than a state in which the finger of the operator is deformed to follow irregularities of the contact face.

9. A tactile sense presentation device comprising:
a panel that includes a support substrate, an electrode formed on the support substrate, and an insulating layer covering the electrode; and
a drive unit that drives the panel,
wherein a tactile sense is presented to an operator by the drive unit applying a signal of a voltage with a predetermined frequency to the electrode, by an electrostatic force generated between the electrode and the operator changing according to the predetermined frequency, and by a frictional force between the operator and a contact face of the insulating layer that is in contact with the operator changing, wherein an arithmetic average roughness of the contact face is a fixed value larger than 0.01 μm and smaller than 0.8 μm, wherein there is a correlation between the arithmetic average roughness and a detection threshold voltage for which the operator can perceive the tactile sense at the arithmetic average roughness, wherein the contact face has the arithmetic average roughness having the detection threshold voltage lower than the detection threshold voltage at a time of an arithmetic average roughness of 0.00 μm, and wherein the voltage applied to the electrode is equal to or higher than a voltage of the detection threshold voltage corresponding to the fixed value of the arithmetic average roughness of the contact face.

10. An electronic apparatus comprising the tactile sense presentation device according to claim 1 on a front face or a rear face of a display apparatus including a touch panel.

11. The electronic apparatus according to claim 10, wherein the touch panel is an optical touch panel.

12. A method of driving a tactile sense presentation device that includes:
a panel that includes a support substrate, an electrode formed on the support substrate, and an insulating layer covering the electrode; and
a drive unit that drives the panel, and
presents a tactile sense to an operator by the drive unit applying a signal of a voltage with a predetermined frequency to the electrode, by an electrostatic force generated between the electrode and the operator changing according to the predetermined frequency, and by a frictional force between the operator and a contact face of the insulating layer that is in contact with the operator changing,
the method comprising:
an arithmetic average roughness of the contact face being a fixed value within a predetermined range which is larger than 0.01 μm and smaller than 0.8 μm, wherein there is a correlation between the arithmetic average roughness and a detection threshold voltage for which the operator can perceive the tactile sense at the arithmetic average roughness, and wherein the drive unit performs:
applying a signal of a voltage that is equal to or higher than the detection threshold voltage corresponding to the fixed value of the arithmetic average roughness of the contact face to the electrode.

13. The method according to claim 12,
wherein the electrode is a plurality of electrodes formed on the support substrate and extending in a predetermined direction, and the insulating layer covers the plurality of electrodes;
wherein the drive unit performs:
specifying one electrode from among the plurality of electrodes corresponding to an area in which the tactile sense is presented to the operator; and
applying the signal of a voltage corresponding to the arithmetic average roughness of the contact face to the specified one electrode.

14. The method according to claim 12, wherein the predetermined range is a range in which the arithmetic average roughness is larger than 0.03 □m and smaller than 0.8 μm.

15. The method according to claim 12, wherein the predetermined range of the arithmetic average roughness is rougher than a state in which a finger of the operator is stuck to the contact face as a contact area between the contact face and the finger of the operator becomes relatively large and is finer than a state in which the finger of the operator is deformed to follow irregularities of the contact face.

16. The tactile sense presentation device according to claim 2, wherein the plurality of electrodes comprises a first electrode extending in a first direction and a second electrode extending in a second direction perpendicular to the first direction.

17. The tactile sense presentation device according to claim 1, wherein the arithmetic average roughness is acquired by folding a roughness curve at a center line and representing a value acquired by dividing an area acquired by the roughness curve and the center line by a length L in units of micrometers.

* * * * *